United States Patent
Nakamura et al.

(10) Patent No.: US 8,137,203 B2
(45) Date of Patent: Mar. 20, 2012

(54) SYSTEM AND METHOD FOR VIRTUAL SPACE-HAZARD ASSESSMENT

(75) Inventors: Megumi Nakamura, Yamato (JP); Mika Saito, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 12/411,459

(22) Filed: Mar. 26, 2009

(65) Prior Publication Data

US 2009/0247297 A1   Oct. 1, 2009

(30) Foreign Application Priority Data

Mar. 27, 2008   (JP) .................................. 2008-84550

(51) Int. Cl.
A63F 9/24 (2006.01)
(52) U.S. Cl. .......................................... 463/62; 434/29
(58) Field of Classification Search ............... 434/29; 463/62; 725/46
See application file for complete search history.

(56) References Cited

U.S. PATENT DOCUMENTS

2008/0040748 A1 *   2/2008   Miyaki ........................... 725/46

FOREIGN PATENT DOCUMENTS

JP   PUPA2004-154449   6/2004
JP   PUPA2006-75616    3/2006

OTHER PUBLICATIONS

Rymaszewski, Michael, et al. Second Life: The Official Guide. Trans. Ranmaru Nakagawa. Tokyo: Impress R&D, May 2007. Chapter1.(p. 23-30), Chapter2.(p. 47,48), Chapter10. http://www.wiley.com/WileyCDA/WileyTitle/productCd-047009608X,descCd-description.html.

* cited by examiner

*Primary Examiner* — Thomas L Dickey
(74) *Attorney, Agent, or Firm* — Vazken Alexanian

(57) ABSTRACT

A virtual-space hazard assessment system, for use in a virtual space, having target identifying information that identifies a target that appears in the virtual space. The system includes: a hazard-rating-request receiver for receiving a hazard rating request to rate the degree of hazard of the target; hazard storage for storing a table in which the degree of hazard of the target and the target identifying information are associated with each other; a hazard-degree increasing mechanism for increasing the degree of hazard of the target stored in the table in the hazard storage according to the degree of hazard received by the hazard-rating-request receiver; a hazard-degree decreasing mechanism for decreasing the degree of hazard stored in the table in the hazard storage with the elapse of time; and hazard-information-output instructing mechanism for issuing an instruction to output hazard information stored in the hazard storage.

29 Claims, 24 Drawing Sheets

PLACE HAZARD DB

| POSITION INFORMATION | | DEGREE OF HAZARD | LAST RATING DATE |
|---|---|---|---|
| X-COORDINATE | Y-COORDINATE | | |
| 4 | 3 | 1 | 7:00 PM, MAR. 1, 2008 |
| 4 | 4 | 1 | 7:00 PM, MAR. 1, 2008 |
| 4 | 5 | 1 | 7:00 PM, MAR. 1, 2008 |
| 4 | 6 | 1 | 7:00 PM, MAR. 1, 2008 |
| 4 | 7 | 1 | 7:00 PM, MAR. 1, 2008 |
| 5 | 3 | 1 | 7:00 PM, MAR. 1, 2008 |
| 5 | 4 | 3 | 7:00 PM, MAR. 1, 2008 |
| 5 | 5 | 3 | 7:00 PM, MAR. 1, 2008 |
| 5 | 6 | 3 | 7:00 PM, MAR. 1, 2008 |
| 5 | 7 | 1 | 7:00 PM, MAR. 1, 2008 |
| 6 | 3 | 1 | 7:00 PM, MAR. 1, 2008 |
| 6 | 4 | 3 | 7:00 PM, MAR. 1, 2008 |
| 6 | 5 | 5 | 7:00 PM, MAR. 1, 2008 |
| 6 | 6 | 3 | 7:00 PM, MAR. 1, 2008 |
| 6 | 7 | 1 | 7:00 PM, MAR. 1, 2008 |
| 7 | 3 | 1 | 7:00 PM, MAR. 1, 2008 |
| 7 | 4 | 3 | 7:00 PM, MAR. 1, 2008 |
| 7 | 5 | 3 | 7:00 PM, MAR. 1, 2008 |
| 7 | 6 | 3 | 7:00 PM, MAR. 1, 2008 |
| 7 | 7 | 1 | 7:00 PM, MAR. 1, 2008 |
| 8 | 3 | 1 | 7:00 PM, MAR. 1, 2008 |
| 8 | 4 | 1 | 7:00 PM, MAR. 1, 2008 |
| 8 | 5 | 1 | 7:00 PM, MAR. 1, 2008 |
| 8 | 6 | 1 | 7:00 PM, MAR. 1, 2008 |
| 8 | 7 | 1 | 7:00 PM, MAR. 1, 2008 |

FIG. 3
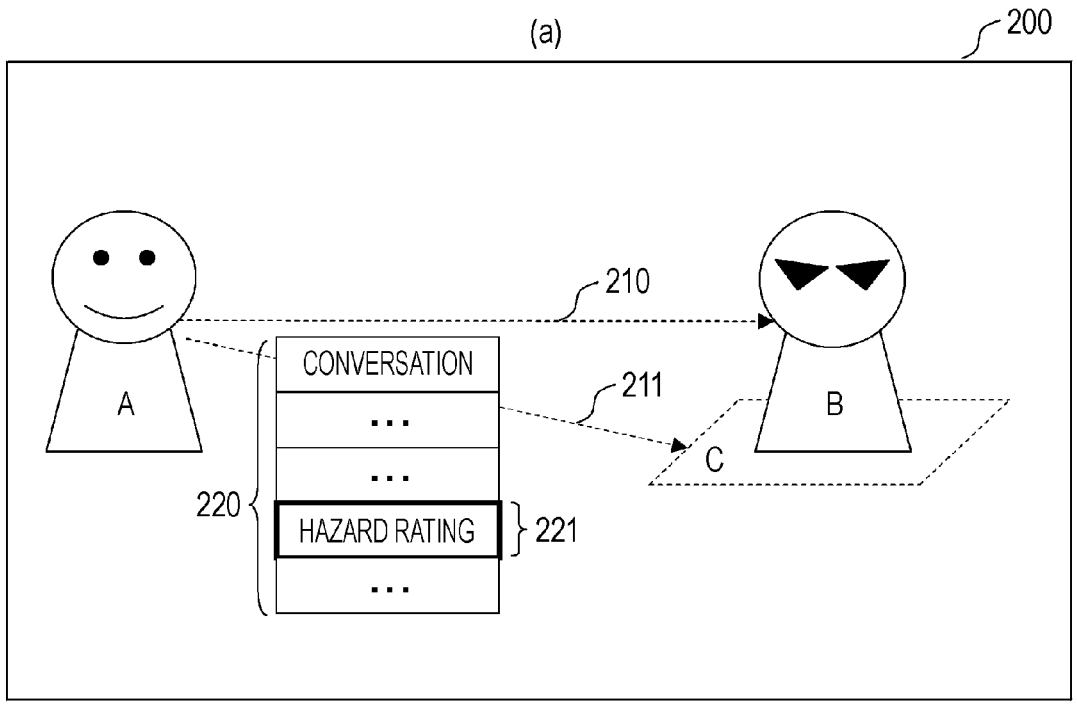
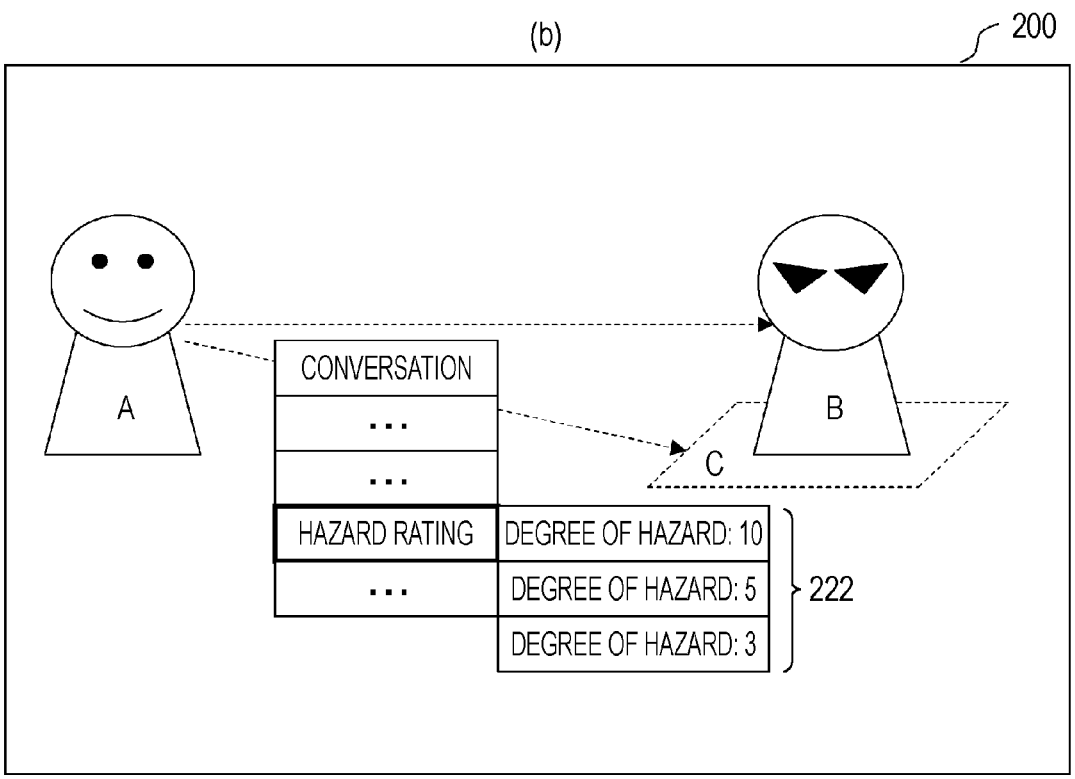

FIG. 4

AVATAR MANAGEMENT DB

| AVATAR ID | POSITION INFORMATION | | NAME | EMPLOYMENT | HOBBY | DATE OF DISAPPEARANCE |
|---|---|---|---|---|---|---|
| | X-COORDINATE | Y-COORDINATE | | | | |
| 123456 | 6 | 5 | B | F COMPANY | FISHING | |
| 134567 | 15 | 45 | C | G OFFICE | TENNIS | |
| 145678 | 45 | 17 | D | H TRADING COMPANY | FOOTBALL | |
| 156789 | | | E | J MOTOR COMPANY | NAP | 7:00 AM, JAN. 10, 2008 |
| ⋮ | ⋮ | ⋮ | ⋮ | ⋮ | ⋮ | ⋮ |

FIG. 5

OBJECT MANAGEMENT DB

| OBJECT ID | POSITION INFORMATION | | DATE OF DISAPPEARANCE |
|---|---|---|---|
| | X-COORDINATE | Y-COORDINATE | |
| 234567 | 3 | 9 | |
| 245678 | 38 | 26 | |
| 256789 | | | 5:00 PM, DEC. 30, 2007 |
| 267890 | 76 | 38 | |
| : | : | : | : |

FIG. 6

INPUT MANAGEMENT DB

| USER ID | INPUT DATE | AVATAR ID | OBJECT ID | POSITION INFORMATION | |
|---|---|---|---|---|---|
| | | | | X-COORDINATE | Y-COORDINATE |
| 7654321 | 7:00 AM, MAR. 10, 2008 | 123456 | | | |
| 8765432 | 8:00 AM, JAN. 11, 2008 | | 2345678 | | |
| 9876543 | 9:00 AM, JAN. 12, 2008 | | | 45 | 62 |
| ⋮ | ⋮ | ⋮ | ⋮ | ⋮ | ⋮ |
| ⋮ | ⋮ | ⋮ | ⋮ | ⋮ | ⋮ |

FIG. 8

AREA ATTRIBUTE TABLE

| AREA | AREA NAME | METHOD OF REDUCTION |
|---|---|---|
| (1,1) - (3,5) | AREA S | METHOD 1 |
| (4,1) - (10,5) | AREA T | METHOD 2 |
| (1,6) - (10,10) | AREA U | METHOD 1 |
| : | : | : |

FIG. 10

AVATAR HAZARD DB

| AVATAR ID | DEGREE OF HAZARD | LAST RATING DATE |
|---|---|---|
| 123456 | 50 | 5:00 PM, MAR. 1, 2008 |
| 145678 | 15 | 7:00 AM, MAR. 10, 2008 |
| ⋮ | ⋮ | ⋮ |
| ⋮ | ⋮ | ⋮ |
| ⋮ | ⋮ | ⋮ |

FIG. 11

OBJECT HAZARD DB

| OBJECT ID | DEGREE OF HAZARD | LAST RATING DATE |
|---|---|---|
| 234567 | 70 | 4:00 PM, MAR. 3, 2008 |
| 267890 | 15 | 7:00 AM, FEB. 10, 2008 |
| : | : | : |
| : | : | : |
| : | : | : |

FIG. 12

PLACE HAZARD DB

| POSITION INFORMATION | | DEGREE OF HAZARD | LAST RATING DATE |
|---|---|---|---|
| X-COORDINATE | Y-COORDINATE | | |
| 4 | 3 | 1 | 7:00 PM, MAR. 1, 2008 |
| 4 | 4 | 1 | 7:00 PM, MAR. 1, 2008 |
| 4 | 5 | 1 | 7:00 PM, MAR. 1, 2008 |
| 4 | 6 | 1 | 7:00 PM, MAR. 1, 2008 |
| 4 | 7 | 1 | 7:00 PM, MAR. 1, 2008 |
| 5 | 3 | 1 | 7:00 PM, MAR. 1, 2008 |
| 5 | 4 | 3 | 7:00 PM, MAR. 1, 2008 |
| 5 | 5 | 3 | 7:00 PM, MAR. 1, 2008 |
| 5 | 6 | 3 | 7:00 PM, MAR. 1, 2008 |
| 5 | 7 | 1 | 7:00 PM, MAR. 1, 2008 |
| 6 | 3 | 1 | 7:00 PM, MAR. 1, 2008 |
| 6 | 4 | 3 | 7:00 PM, MAR. 1, 2008 |
| 6 | 5 | 5 | 7:00 PM, MAR. 1, 2008 |
| 6 | 6 | 3 | 7:00 PM, MAR. 1, 2008 |
| 6 | 7 | 1 | 7:00 PM, MAR. 1, 2008 |
| 7 | 3 | 1 | 7:00 PM, MAR. 1, 2008 |
| 7 | 4 | 3 | 7:00 PM, MAR. 1, 2008 |
| 7 | 5 | 3 | 7:00 PM, MAR. 1, 2008 |
| 7 | 6 | 3 | 7:00 PM, MAR. 1, 2008 |
| 7 | 7 | 1 | 7:00 PM, MAR. 1, 2008 |
| 8 | 3 | 1 | 7:00 PM, MAR. 1, 2008 |
| 8 | 4 | 1 | 7:00 PM, MAR. 1, 2008 |
| 8 | 5 | 1 | 7:00 PM, MAR. 1, 2008 |
| 8 | 6 | 1 | 7:00 PM, MAR. 1, 2008 |
| 8 | 7 | 1 | 7:00 PM, MAR. 1, 2008 |

|   | 1 | 2 | 3 | 4 | 5 | 6 | 7 | 8 | 9 | 10 |
|---|---|---|---|---|---|---|---|---|---|---|
| 1 |   |   |   |   |   |   |   |   |   |   |
| 2 |   |   |   |   |   |   |   |   |   |   |
| 3 |   |   |   |   |   |   |   |   |   |   |
| 4 |   |   | 1 | 1 | 1 | 1 | 1 |   |   |   |
| 5 |   |   | 1 | 3 | 3 | 3 | 1 |   |   |   |
| 6 |   |   | 1 | 3 | 5 | 3 | 1 |   |   |   |
| 7 |   |   | 1 | 3 | 3 | 3 | 1 |   |   |   |
| 8 |   |   | 1 | 1 | 1 | 1 | 1 |   |   |   |
| 9 |   |   |   |   |   |   |   |   |   |   |
| 10 |   |   |   |   |   |   |   |   |   |   |

(b)

|   | 1 | 2 | 3 | 4 | 5 | 6 | 7 | 8 | 9 | 10 |
|---|---|---|---|---|---|---|---|---|---|---|
| 1 |   |   |   |   |   |   |   |   |   |   |
| 2 |   |   |   |   | 1 | 1 | 1 | 1 | 1 |   |
| 3 |   |   |   |   | 1 | 3 | 3 | 3 | 1 |   |
| 4 |   |   |   |   | 1 | 3 | 5 | 3 | 1 |   |
| 5 |   |   |   |   | 1 | 3 | 3 | 3 | 1 |   |
| 6 |   |   |   |   | 1 | 1 | 1 | 1 | 1 |   |
| 7 |   |   |   |   |   |   |   |   |   |   |
| 8 |   |   |   |   |   |   |   |   |   |   |
| 9 |   |   |   |   |   |   |   |   |   |   |
| 10 |   |   |   |   |   |   |   |   |   |   |

(c)

|   | 1 | 2 | 3 | 4 | 5 | 6 | 7 | 8 | 9 | 10 |
|---|---|---|---|---|---|---|---|---|---|---|
| 1 |   |   |   |   |   |   |   |   |   |   |
| 2 |   |   |   |   | 1 | 1 | 1 | 1 | 1 |   |
| 3 |   |   |   |   | 1 | 3 | 3 | 3 | 1 |   |
| 4 |   |   | 1 | 1 | 2 | 4 | 6 | 3 | 1 |   |
| 5 |   |   | 1 | 3 | 4 | 6 | 4 | 3 | 1 |   |
| 6 |   |   | 1 | 3 | 6 | 4 | 2 | 1 | 1 |   |
| 7 |   |   | 1 | 3 | 3 | 3 | 1 |   |   |   |
| 8 |   |   | 1 | 1 | 1 | 1 | 1 |   |   |   |
| 9 |   |   |   |   |   |   |   |   |   |   |
| 10 |   |   |   |   |   |   |   |   |   |   |

FIG. 16
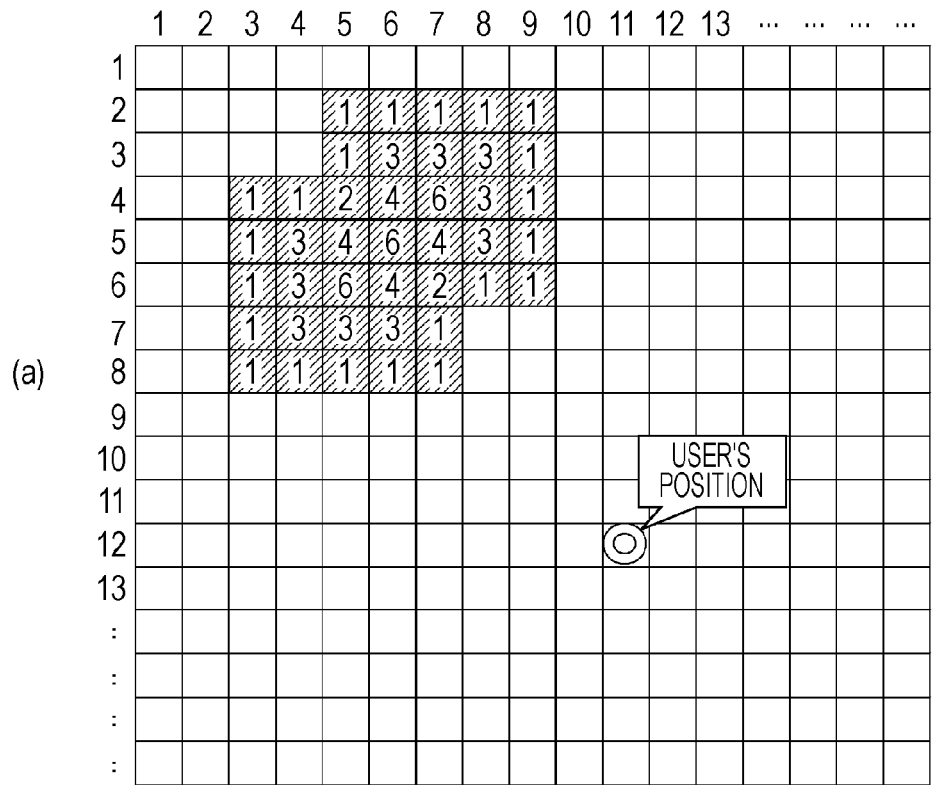
(a)
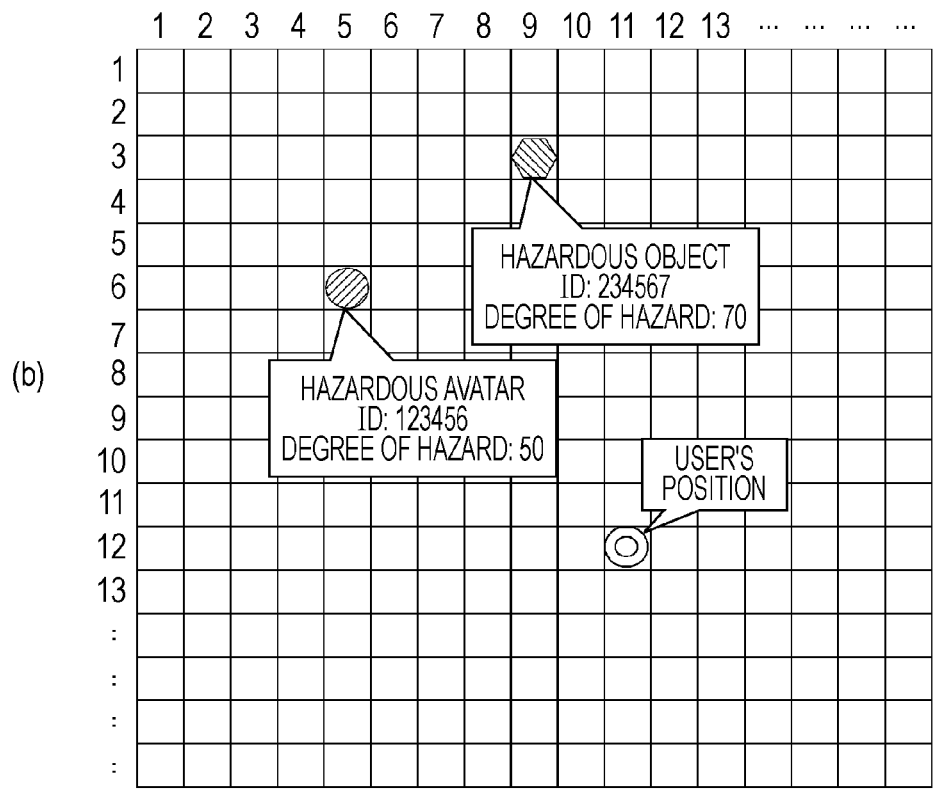
(b)

FIG. 23

DISPLAY SELECTION DB

| USER ID | SELECTION OF DISPLAY |
|---|---|
| 7654321 | 1 |
| 8765432 | 0 |
| : | : |

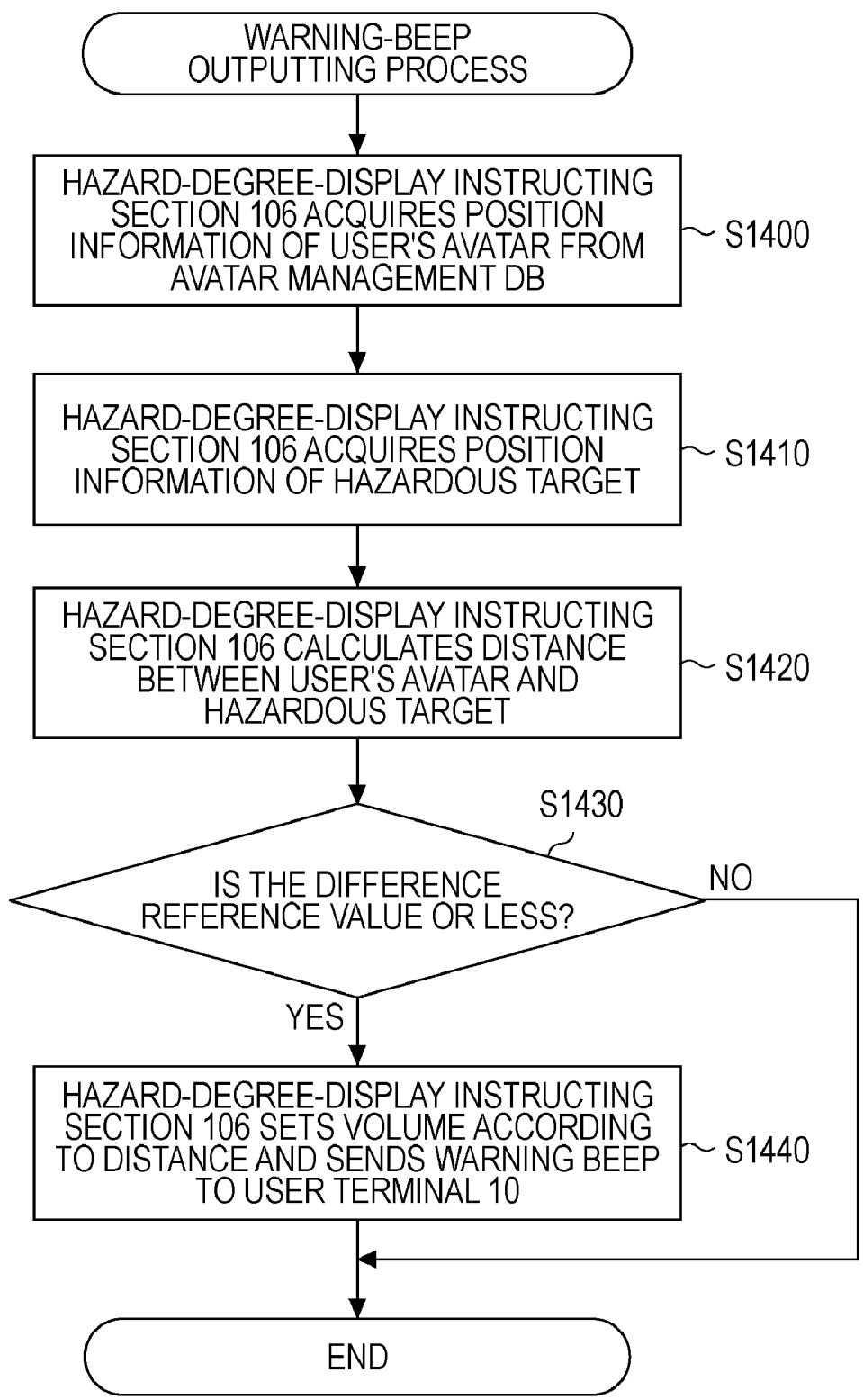

SYSTEM AND METHOD FOR VIRTUAL SPACE-HAZARD ASSESSMENT

CROSS REFERENCE TO RELATED APPLICATION

This application claims priority under 35 U.S.C. 119 from Japanese Patent Application No. 208-84550 filed Mar. 27, 2008, the entire contents of which are incorporated herein by reference.

BACKGROUND OF THE INVENTION

1. Field of the Invention

The present invention relates to a virtual-space hazard assessment system for assessing the hazard of an avatar that commits a hazardous act or the like in a virtual world (space) typified by Second Life, and a method and program for the same.

2. Description of Related Art

In virtual world (3-D Internet) communities typified by Second Life, a mechanism of providing simulated experience similar to that of real life is becoming widespread (for example, refer to Rymaszewski, Michael, et al. Second Life: The Official Guide, Trans. Ranmaru Nakagawa, Impress R&D, May 2007).

Such virtual worlds have various persons (avatars) and objects, some of which harass others or contrive to infect a person who touches them with computer virus, and therefore virtual worlds have hazards as in the real world.

Such hazards are present not only in avatars and objects but also in places. For example, places in which hazardous avatars appear or places in which persons feel uncomfortable should not be approached.

Also, as in the real world, off-limits areas and danger zones are designated and dangerous objects are given danger signs.

Not only Second Life but also the world of computer games is a kind of virtual world, in which a system for preventing contact between persons and vehicles and assessing hazard due to contact with enemy characters is proposed.

For example, Japanese Unexamined Patent Application Publication No. 2006-75616 proposes a technique for preventing persons from entering danger zones and caution zones set around a motorcycle or letting people move therefrom in a motorcycle game in which a person travels on urban areas as opposed to race circuits. Japanese Unexamined Patent Application Publication No. 2004-154449 proposes a technique of displaying multiple concentric ring-shaped areas to indicate the degree of hazard when the distance between a player character and an enemy character decreases to a predetermined value or less.

SUMMARY OF THE INVENTION

The virtual-space hazard assessment system includes: a hazard-rating-request receiver for receiving a hazard rating request to rate the degree of hazard of the target, the degree being a value inputted on a terminal by the user; a hazard storage for storing a table in which the degree of hazard of the target and the target identifying information are associated with each other; a hazard-degree increasing mechanism for increasing, for the target for which the hazard rating request is received by the hazard-rating-request receiver, the degree of hazard of the target stored in the table in the hazard storage according to the degree of hazard received by the hazard-rating-request receiver; a hazard-degree decreasing mechanism for decreasing the degree of hazard stored in the table in the hazard storage with the elapse of time; and a hazard-information-output instructor for issuing an instruction to output the stored hazard information.

When the invention is implemented as a method of determining degree of hazard of a virtual space having target identifying information that identifies a target that appears in the virtual space, the method includes: providing a computer and using the computer to perform each of the following steps; receiving a hazard rating request to rate the degree of hazard of the target, the degree being a value inputted to a terminal by the user; storing a table in a storage unit, the table listing the degree of hazard of the target and the target identifying information in association with each other; increasing the degree of hazard of the target stored in the table in the storage unit in response to the hazard rating request; decreasing the degree of hazard of the target stored in the table in the storage unit in response to the elapse of time; and outputting the degree of hazard stored in the table.

The invention provides an article of manufacture tangibly embodying computer readable program code, which when executed by a computer, will cause the computer to perform the steps of the above method.

BRIEF DESCRIPTION OF THE DRAWINGS

FIG. 3 is a diagram showing a hazard rating scene according to the first embodiment.

FIG. 4 is a diagram of an avatar management data base (DB) according to the first embodiment.

FIG. 5 is a diagram of an object management DB according to the first embodiment.

FIG. 6 is a diagram of an input management DB according to the first embodiment.

FIG. 8 is a diagram of an area attribute table according to the first embodiment.

FIG. 10 is a diagram of an avatar hazard DB according to the first embodiment.

FIG. 11 is a diagram of an object hazard DB according to the first embodiment.

FIG. 12 is a diagram of a place hazard DB according to the first embodiment.

FIG. 13 shows an example in which the degrees of hazard of places are updated on a hazard map, according to the first embodiment.

FIG. 16 shows an example in which targets rated for hazard degree are displayed on a map, according to the first embodiment.

FIG. 23 is a diagram of a display selection DB according to the second embodiment.

FIG. 24 is a flowchart for a warning-beep outputting process according to the second embodiment.

DETAILED DESCRIPTION OF PREFERRED EMBODIMENTS

Figure 1:
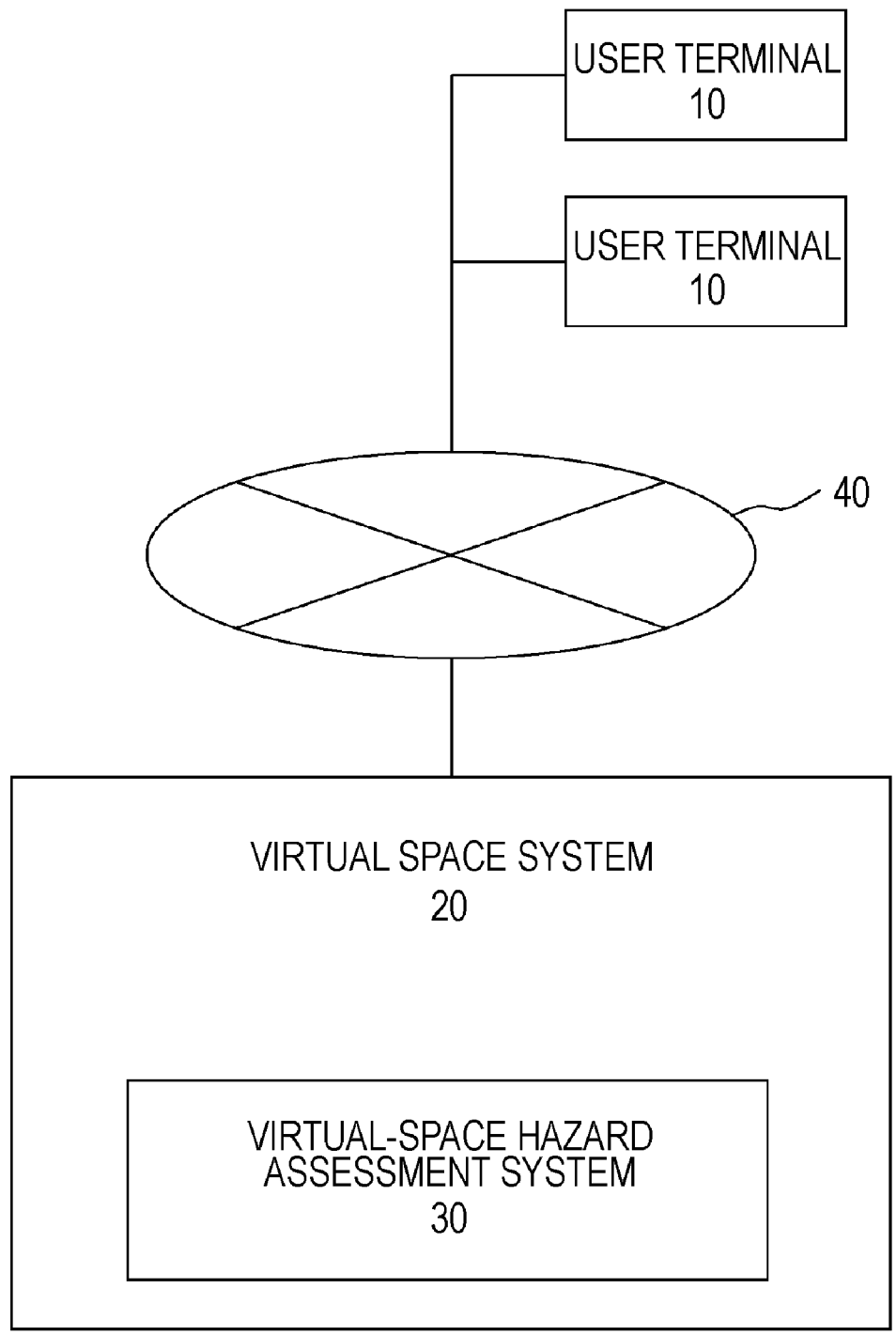
FIG. 1 is a block diagram of a virtual-space hazard assessment system according to a first embodiment of the invention.

A computer game world may, for example, provide a system in which motorcycles and enemy characters are set as hazardous objects from the beginning and in which the degree of hazard is assessed according to the distance from them. However, in such virtual world communities as Second Life, hazardous acts are generally recognized in the simulated life, as in the real world, so that they are not presented as hazardous target from the beginning.

The invention provides a technique for managing hazards in virtual world communities by allowing designation of a hazard that players saw, and collecting information to assess the hazard, and when such designation is not performed for a predetermined period, gradually decreasing the degree of hazard.

The system grasps the degree of hazard of a virtual world community according to sighting information by the player, assessing the hazard from a temporal viewpoint, and displaying it. More specifically, the invention includes a virtual-space hazard assessment system, for use in a virtual space having target identifying information that identifies a target that appears in the virtual space.

The virtual-space hazard assessment system includes: a hazard-rating-request receiver for receiving a hazard rating request to rate the degree of hazard of the target, the degree being a value inputted on a terminal by the user; a hazard storage for storing a table in which the degree of hazard of the target and the target identifying information are associated with each other; a hazard-degree increasing mechanism for increasing, for the target for which the hazard rating request is received by the hazard-rating-request receiver, the degree of hazard of the target stored in the table in the hazard storage according to the degree of hazard received by the hazard-rating-request receiver; a hazard-degree decreasing mechanism for decreasing the degree of hazard stored in the table in the hazard storage with the elapse of time; and a hazard-information-output instructor for issuing an instruction to output hazard information stored in the hazard storing means.

In accordance with one embodiment of the invention, the degree of hazard of a target that appears in a virtual space by the user who senses the hazard is rated and information of the degree of hazard of the target is presented at an output. Therefore, the invention allows the user to avoid a hazardous target and also to prevent a hazardous act as in the real world, thus allowing a safe comfortable virtual space to be achieved.

Since the degree of hazard stored is increased as hazard rating is executed, the degree of hazard of the hazardous target is continuously increased. This gives a serious warning to the user who uses the virtual space, thus allowing the user to easily avoid such a target in the virtual space.

Furthermore, the degree of hazard once rated decreases with time. Therefore, the degree is automatically decreased from the target that has become nonhazardous, and thus only a target that continues a hazardous act is hazardous in the virtual space, so that the accurate state of the hazard can be reflected.

Moreover, there is no need for a special operation to decrease the degree of hazard, thus facilitating system management.

In the virtual-space hazard assessment system described above, the target may be a place and the assessment system may include proximity-hazard-degree calculator for calculating the degree of hazard of an area adjacent to the place according to the degree of hazard of the place.

This embodiment of the invention allows rating of the hazard of an area adjacent to a hazardous place. Therefore, the hazard place can be recognized as a wide area. This prevents the user from approaching the hazardous place without awareness, allowing the user to act out of the hazardous place.

The virtual-space hazard assessment system described above may also utilize a method for calculating the degree of hazard in advance according to the place and calculating, in the proximity-hazard-degree calculator, the degree of hazard of the area adjacent to the place using the calculation method according to the place.

This embodiment of the invention can also cope with a case in which the degree of hazard varies with the nature of a hazardous place such as when the hazardous place is locally hazardous or when the hazardous place is relatively wide.

In another modification of the embodiment of the virtual-space hazard assessment system described above, the hazard storage further stores the time when the target is subjected to hazard rating and the target identifying information of the target in association with each other, and the hazard-degree decreasing mechanism decreases the degree of hazard of the target according to the time elapsed after the target is subjected to hazard rating.

This modification of the invention allows the degree of hazard to be decreased when hazard rating by the user is not performed for a predetermined time or more. This allows the degree of hazard to be automatically deleted from a target which was hazardous but has now become safe. Accordingly, the present degree of hazard can be reflected accurately.

Moreover, there is no need for a special operation for deleting the degree of hazard, thus releasing the user from a complicated hazard management.

Thus the degree of hazard of a target that commits no hazardous act is automatically decreased. Therefore, an avatar once rated as a hazardous avatar can be present continuously as a nonhazardous avatar in the virtual space by stopping a hazardous act. This provides a user in the virtual space with motivation to stop a hazardous act.

Even if a nonhazardous target is unreasonably rated hazardous by a malicious user, the degree of hazard is lost finally unless the user continues unreasonable hazard rating, thus preventing a bad influence on hazard management by the malicious user.

The embodiment of the virtual-space hazard assessment system described above may further include: input storage for storing information that identifies a user who rates the degree of hazard of the target, the time when the target is subjected to hazard rating, and the target identifying information of the target in association with one another; and abnormal-hazard-rating preventing mechanism for preventing repeated rating of the degree of hazard of the same target by the same user in a predetermined time according to the record in the input storage.

This configuration of the invention prevents a malicious hazard rating of a specific target by a specific user to allow sound hazard management. This prevents hazard rating by a malicious user such as a claimer.

The virtual-space hazard assessment system may utilize a hazard-rating-request receiver that receives the degree of hazard designated by the user.

This configuration of the invention allows hazard rating according to the degree of hazard detected by the user, thus permitting hazard management according to whether the hazardous act is minor or serious.

The virtual-space hazard assessment system may utilize a hazard-information-output instructing means makes the position information of a hazardous target be displayed on the user terminal.

This configuration of the invention allows the position information of a hazardous target to be displayed on the user terminal. Accordingly, the user can act in the virtual space while avoiding the hazardous target.

The virtual-space hazard assessment system may utilize a hazard-information-output instructing mechanism that issues an instruction to output information indicative of whether a target displayed on the user terminal is hazardous.

This configuration of the invention allows the user to know whether a target that the user encounters in the virtual spade is hazardous. Accordingly, the user can avoid contact with a hazardous target without awareness.

The virtual-space hazard assessment system may utilize a hazard-information-output instructing mechanism that issues an instruction to output information determined from the position information of the user and the position information of a hazardous target.

This configuration of the invention allows hazard information to be output according to the distance between the user and a hazardous target in the virtual space. Accordingly, if a hazardous target is present in an adjacent place that is not seen by the user, for example, on the back, the user can be informed of hazard by sound information or the like. As a result, the user can avoid contact with the hazardous target by moving from the place.

The virtual-space hazard assessment system may also utilize a hazard-information-output instructing mechanism that issues an instruction to output the information of the degree of hazard of the target according to the selection of whether or not to output the information of the degree of hazard of the target.

This configuration of the invention allows the user to select whether to display the degree of hazard. This allows the user to act in the virtual space and distinguish between the time to be careful about a hazardous target and the time safety is confirmed, so that there is no need to be careful about a hazardous target.

Particularly, in outputting the degree of hazard, various displays or sounds are output according to the degree of hazard. This reduces comfort while providing safety. This is prevented by the invention. Moreover, this action is acceptable because it is similar to that of the real world.

The virtual-space hazard assessment system may further include a hazard deleting mechanism for deleting the information of the degree of hazard of a target that has disappeared from the virtual space from the table stored in the hazard storing means.

With this configuration of the invention, hazard management information of a target that has disappeared from the virtual space is deleted. This eliminates the need for unnecessary hazard management, thus avoiding wasting storage resources.

According to another embodiment, the invention may be implemented as a method for assessing the degree of hazard of a virtual space having target identifying information that identifies a target that appears in the virtual space. The method includes: receiving, by a computer, a hazard rating request to rate the degree of hazard of the target, the degree being a value inputted on a terminal by the user; storing in a storage unit in the computer a table in a storage unit, the table listing the degree of hazard of the target and the target identifying information in association with each other; using the computer to increase the degree of hazard of the target stored in the table in the storage unit in response to the hazard rating request; using the computer to decrease the degree of hazard of the target stored in the table in the storage unit with the elapse of time; and using the computer to present hazard information stored to the storage unit.

In the method for assessing the degree of hazard of a virtual space, the target can be a place; and the computer can calculate the degree of hazard of an area adjacent to the place according to the degree of hazard of the place.

The method for assessing the degree of hazard of a virtual space may also include calculating the degree of hazard in advance according to the place; and the computer may calculate the degree of hazard of the area adjacent to the place using the calculation method according to the place.

The method may also include the steps of storing, in the computer, the time when the target is subjected to hazard rating and the target identifying information of the target in association with each other; and using the computer to decrease the degree of hazard of the target according to the time elapsed after the target is subjected to hazard rating.

The method for assessing the degree of hazard of a virtual space may further utilize the computer to display the position information of a hazardous target on the user terminal.

The method for assessing the degree of hazard of a virtual space may also utilize the computer to output information indicative of whether a target displayed on the user terminal is hazardous.

The method may further utilize the computer to output information determined from the position information of the user and the position information of a hazardous target.

Another embodiment of the invention is a computer program product including computer readable program code embodied in a tangible medium which, when executed by a computer will cause the computer to perform the method described above.

This invention allows a user who witnessed a hazardous target in a virtual space to rate the degree of hazard, and if the hazard is unreasonably rated or has disappeared, the degree of hazard to be decreased automatically without the need for a special operation to delete the degree, thus allowing appropriate hazard management without time and trouble.

The system according to the invention can output hazard information. Therefore, the system allows the user to keep away from hazard objects, thus achieving a safe and comfortable virtual space.

Preferred embodiments of the invention will be described in detail with reference to the drawings. It is to be understood that they are illustrative only and the scope of the invention is not limited to the specific details described below.

Referring to FIG. 1, a block diagram of a virtual-space hazard assessment system is shown. The virtual-space hazard assessment system 30 is part of a virtual space system 20. The virtual space system 20 is connected to a plurality of user terminals 10 via the Internet. The virtual-space hazard assessment system 30 is principally composed of a server and a database (not shown).

Users live socially, each using an avatar that represents the user in a virtual space (virtual society) that the virtual space system 20 provides. The virtual society has not only the avatars but also objects and places for activities. The virtual-space hazard assessment system 30 is a subsystem that assesses the hazard of avatars that commit hazardous acts in the virtual society.

Figure 2:
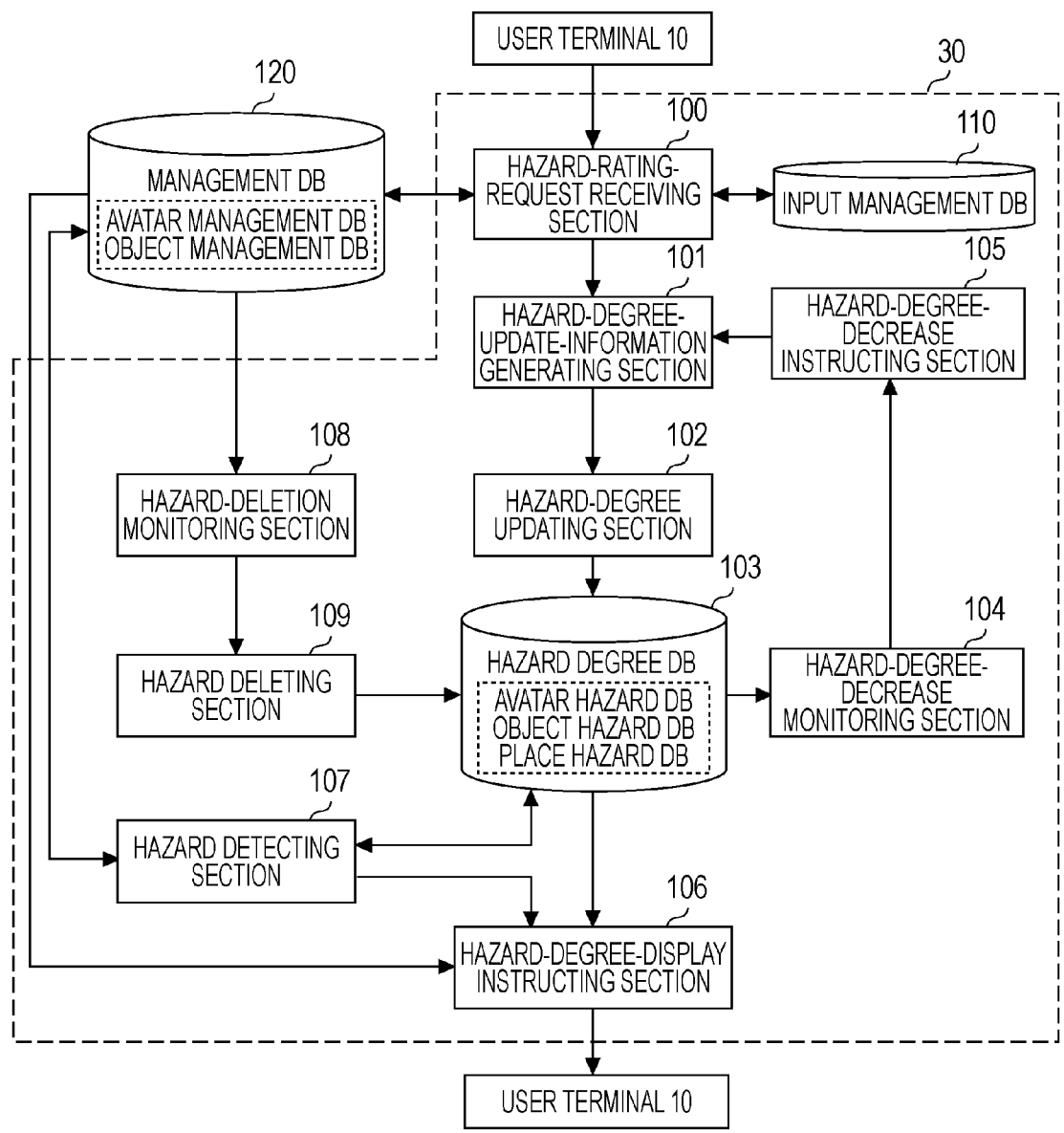
FIG. 2 is a block diagram of the functional structure of the virtual-space hazard assessment system according to the first embodiment.

Referring to FIG. 2, a block diagram of the functional structure of the virtual-space hazard assessment system 30 is shown.

The virtual-space hazard assessment system 30 includes a hazard-rating-request receiving section 100, a hazard-degree-update-information generating section 101, a hazard-degree updating section 102, a hazard-degree database (DB) 103, a hazard-degree-decrease monitoring section 104, a hazard-degree-decrease instructing section 105, a hazard-degree-display instructing section 106, a hazard detecting section 107, a hazard-deletion monitoring section 108, and a hazard deleting section 109. They correspond to the part enclosed by the broken line in FIG. 2. In this embodiment, a management DB 120 constitutes part of the virtual space system 20 and is disposed outside the virtual-space hazard assessment system 30; instead, it may be included in the virtual-space hazard assessment system 30.

The hazard-rating-request receiving section 100 receives a hazard rating request input at the user terminal 10. The user inputs the request for rating the avatar, object, or place that the user saw in the virtual space according to its hazardous act or the like with a mouse-click or the like. The hazard-rating-request receiving section 100 corresponds to hazard-rating-request receiving means.

A specific method for hazard rating is described below.

Referring to FIG. 3, the diagram shows a hazard rating scene, in which an avatar A of the user encounters an avatar B that commits a hazardous act in a virtual space 200 displayed on the user terminal 10.

Referring to FIG. 3(*a*), to rate the hazard of the avatar B, the user first left-clicks on the avatar B. Then, a broken-line arrow 210 extends from the avatar A to the avatar B. When the user right-clicks on the arrow 210, a user action menu 220 is displayed.

When the user selects a hazard rating menu 221, then a hazard-degree selection menu 222 is displayed as shown in FIG. 3(*b*). When the user selects a desired degree, the degree of hazard of the avatar B is entered. Thus, the hazard-rating-request receiving can receive the degree of hazard designated by the user.

Since there are various hazards from minor to serious degrees, and hazardous objects often commit a minor hazardous act first and escalate into a serious act, this method can deal with those.

The selection of the degree may not necessarily be performed; instead, a fixed value may always be assigned.

Thus, since hazard rating is performed with a simple operation like conversation, this system can easily rate the hazard of an avatar that says disagreeable things during conversation.

When the degree of hazard of the avatar B is entered, the user terminal 10 sends a set of the Id of the avatar B and the degree of hazard thereof to the virtual-space hazard assessment system 30. In this way, the hazard-rating-request receiving means can receive the hazard rating request from the user.

When the target of hazard rating is an object and a place, a hazard rating request is generated by a principally similar system. For example, to rate the degree of hazard of a place C, the user left-clicks on the place C. Then, a broken-line arrow 211 extending from the avatar A to the place C is displayed. Subsequent processes are the same as the above.

Position information for specifying a position is defined by the X-coordinate and the Y-coordinate. The coordinates may be expressed by continuous real numbers. In this embodiment, places are divided into cells and expressed as integers 1, 2, 3 and so on corresponding to the positions of the cells. However, dividing the places into smaller cells results in substantially continuous real numbers. Furthermore, the position information may be expressed in three dimensions by adding the Z-coordinate. For example, to specify a position in a building, three-dimensional representation is effective. In this case also, the Z-coordinate is expressed by integers.

Another method may be employed for places; that is, a method for automatically rating the degree of hazard of a place where an avatar or an object is present when they are rated. In this case, no special operation is needed for the place. However, since no special operation is executed, the degree of hazard is set to a fixed value. The fixed value may be set either by the user terminal 10 or the hazard-rating-request receiving section 100.

To automatically rate the degree of hazard of places, a hazardous place rating request may be generated by the user terminal 10 using the function of Ajax or the like, or may be generated by the hazard-rating-request receiving section 100 in the virtual-space hazard assessment system 30.

To generate a hazardous place rating request when the degree of hazard of the avatar or the like is rated, the hazard-rating-request receiving section 100 finds the place where the avatar or the like is at present with reference to the management DB 120.

The management DB 120 stores the places where the avatars and objects in the virtual space are at present, and is used by the virtual space system 20. The management DB 120 is divided into an avatar management DB and an object management DB.

Referring to FIG. 4, a diagram of the avatar management DB is shown, in which the IDs of the avatars in the virtual space, information of the places where the avatars are at present, the names, the employments, the hobbies, and the date of disappearance. The date of disappearance is the date an avatar disappeared from the virtual space. Information stored in the avatar management DB is not limited to those.

FIG. 5 is a diagram of the object management DB. The object management DB stores the IDs of the objects in the virtual space, the information of the places where the objects are at present and the date of disappearance. The date of disappearance is the date an object disappeared from the virtual space. Information stored in the object management DB is not limited to those.

The generation of the hazardous place rating request at the user terminal 10 using the function of Ajax or the like is on the precondition that information on the place where an avatar or the like is at present, which is displayed on the user terminal 10, has been sent to the user terminal 10. Accordingly, if the precondition is not satisfied, the hazardous place rating request is generated at the hazard-rating-request receiving section 100.

Referring back to FIG. 2, avatars are each identified by an avatar ID, objects are each identified by an object ID, and places are each specified by position information.

When a target of hazard rating is specified, the hazard-rating-request receiving section 100 determines whether the same target is rated from the same user in a predetermined time with reference to an input management DB 110. If it is determined that the target is rated, then the hazard-rating-request receiving section 100 rejects the hazard rating request.

This prevents duplicated hazard rating such that the same target is repeatedly rated by the same user in a predetermined time, thereby preventing unreasonable hazard rating by a malicious user. To accept the hazard rating request, it is stored in the input management DB 110.

The hazard-rating-request receiving section 100 functions as abnormal-hazard-rating preventing means for disabling hazard rating of the same target by the same user in a predetermined time.

FIG. 6 is a diagram of the input management DB. The input management DB in FIG. 6 stores the IDs of users who have input a hazard rating request, the dates of input, the ID of an avatar subjected to hazard rating, the ID of an object subjected to hazard rating, and the information of a place subjected to hazard rating. The avatar ID, the object ID, and the position information are stored selectively. This is because it depends on the target of the hazard rating by the user. Thus, the input management DB 110 corresponds to input storing means.

The hazard-rating-request receiving section 100 can determine whether the hazard rating is for the same target by the same user in a predetermined time by referring to the record in the input management DB 110.

Referring back to FIG. 2, the hazard rating request received sometimes includes the degree of hazard or does not include it, as described above. If the degree of hazard is not included, the hazard-rating-request receiving section 100 adds the degree of hazard, and sends a combination of information that identifies the target and the degree of hazard thereof to the hazard-degree-update-information generating section 101.

The hazard-degree-update-information generating section 101 receives the combination of target identifying information and the degree of hazard from the hazard-rating-request receiving section 100. The target is one of avatars, objects, and places. When the target is a place, not only the place but also places adjacent to the place are rated. The hazard-degree-update-information generating section 101 functions as proximity-hazard-degree calculating means.

Figure 7:
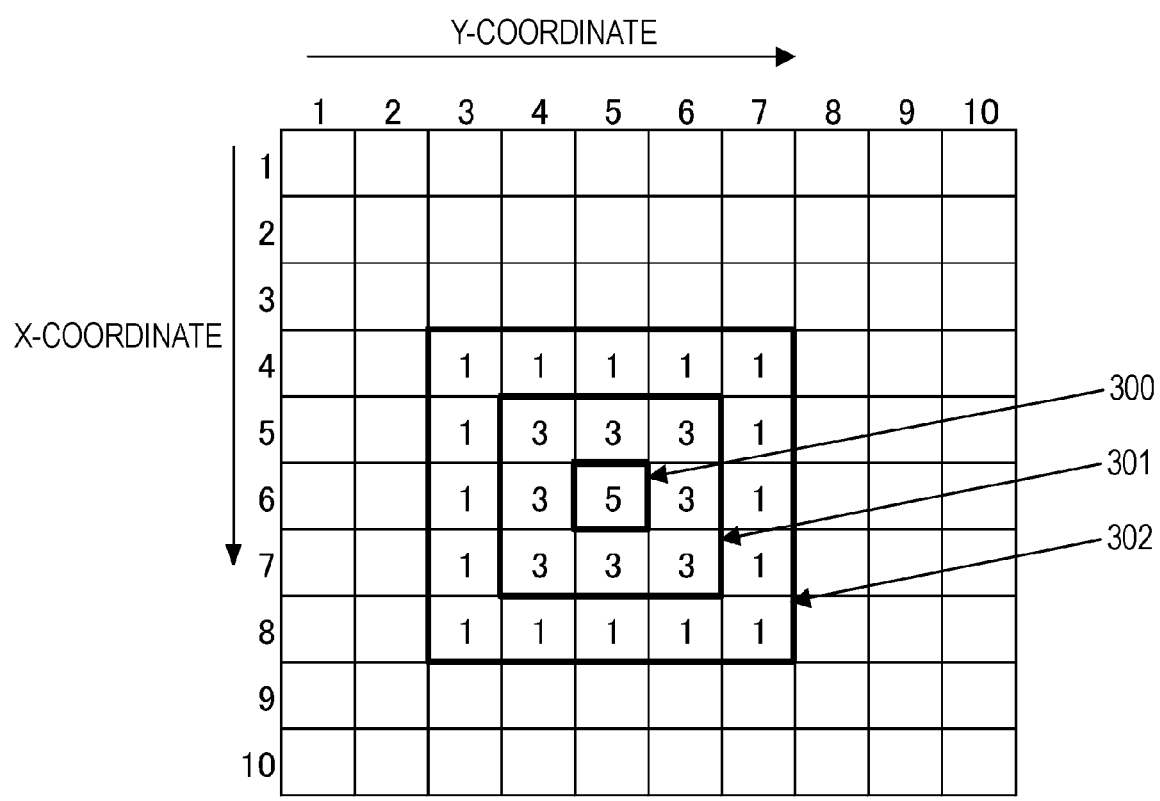
FIG. 7 is a diagram of a system for rating the degree of hazard of near-by places according to the first embodiment.

A description of the above will be given with reference to FIG. 7. FIG. 7 is a diagram of a system for rating the degree of hazard of near-by places.

First, suppose a place (designated by numeral 300) with the X-coordinate 6 and the Y-coordinate 5 is rated as hazard degree 5 according to a user instruction. Hereinafter, the vertical axis is referred to as the X-coordinate, the horizontal axis is referred to as the Y-coordinate, and the place with X-coordinate 6 and the Y-coordinate 5 is referred to as a place (6, 5).

In this case, eight places (5, 4), (5, 5), (5, 6), (6, 4), (6, 6), (7, 4), (7, 5), and (7, 6) are adjacent to the place (6, 5). Those places are rated as a hazard degree 3 which is lower than the hazard degree 5 of the central place (6, 5) by two. Likewise, 16 places around them are rated as a hazard degree 1.

Thus, the degree of hazard to be assigned is decreased by two as cells come apart from the central place (6, 5) designated first. When the degree of hazard falls below zero, the assignment is completed. Then, cells of the same hazard degree are arranged in a concentric configuration along closed curves 300, 301, and 302 (in this case, closed straight lines, but they are included in closed curves in a broad sense) around the cell (6, 5).

Thus, the hazard rating of one place leads to the hazard rating of a predetermined expanse of areas. The size of the cells may be set as appropriate, so that it is set smaller to achieve accurate positioning. However, this recognition of a place subjected to hazard rating as a small cell is not practical because it makes it difficult to recognize the degree of hazard of a place in a virtual space. Therefore, this problem is solved by rating the hazard of such peripheral places.

In this example, while the degree of hazard is successively decreased by two as cells are separated from the center, the invention is not limited to that. The degree may be successively decreased by one or may be decreased with the distance from the central cell (the distance between cells) according to a rule. For example, the invention may adopt a method whereby the degree of hazard is decreased by half as cells are separated from the center by one. Thus, the proximity-hazard-degree calculating means can calculate the degree of hazard of the areas around a place according to the degree of hazard of the place.

The method of calculation may be varied from place to place. For example, the degree of hazard of one place may be decreased monotonously by two, while that of another place may be decreased according to another rule. In that case, the method of calculation depends on the place.

Referring to FIG. 8, a diagram of an area attribute table is shown. The area attribute table defines the method of calculation for each area that is a set of places. For example, an area S uses Method 1 to calculate the places that belong to an area in which areas (1, 1) and (3, 5) are the vertexes of the diagonals. Method 1 is a method of decreasing the degree monotonously by one, for example. Method 2 is a method of decreasing the degree monotonously by two, for example.

Figure 9:
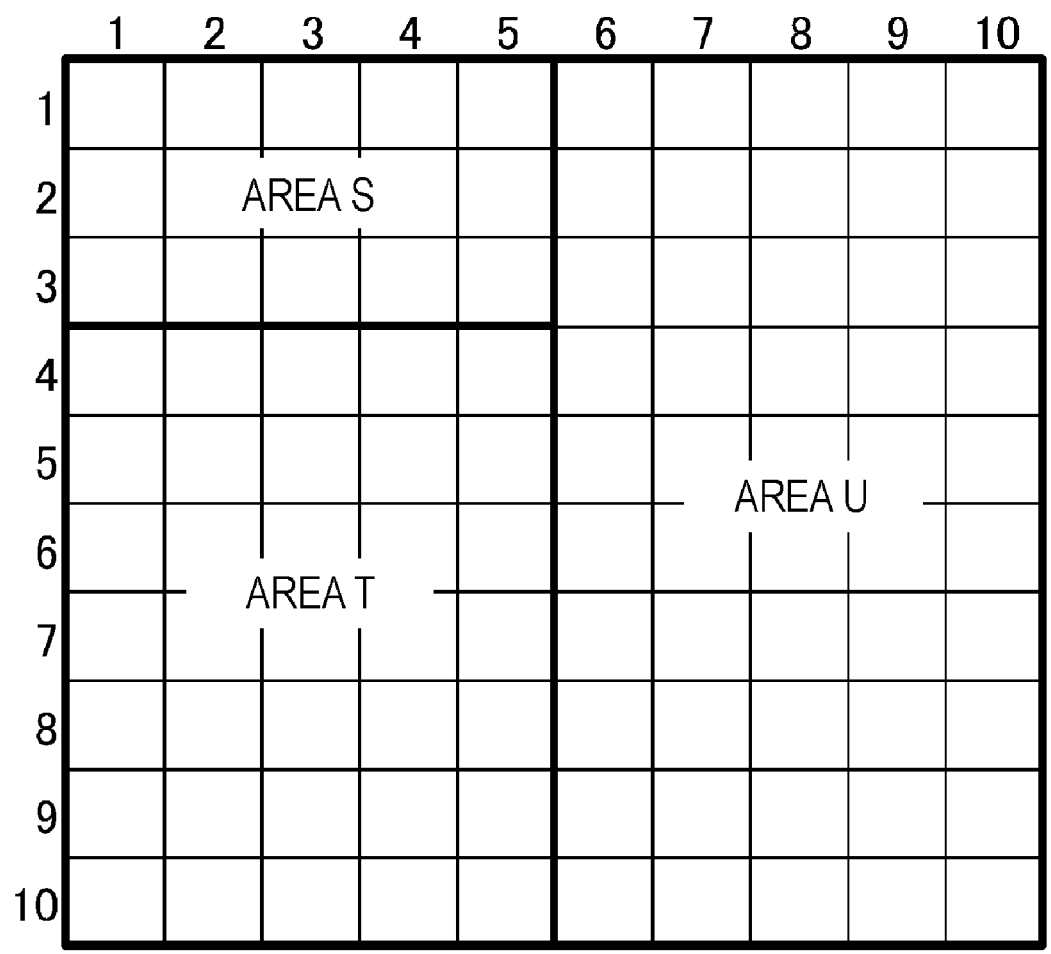
FIG. 9 is a diagram of areas displayed on a map according to the first embodiment.

FIG. 9 is a diagram of areas displayed on a map. The areas shown in FIG. 8 can be displayed on a map as shown in FIG. 9. Areas S and U are under the application of Method 1, and an area T is under the application of Method 2. Therefore, the above-described place (6, 5), which is in the area T, is under the application of Method 2. Thus, the proximity-hazard-degree calculating means can calculate the degree of hazard of the areas around the place using the method of calculation depending on the place.

Referring back to FIG. 2, the hazard-degree-update-information generating section 101 thus generates information of how many and for which target the degree of hazard should be increased.

The hazard-degree-update-information generating section 101 does not generate only the information of increasing the degree of hazard. The hazard-degree-update-information generating section 101 receives a combination of information that identifies a target and the degree of hazard thereof to be decreased from the hazard-degree-decrease instructing section 105, and generates information of how many and for which target the degree of hazard should be decreased. Further details will be described later. The degree of hazard to be decreased is set as a negative value so that an add operation can be performed integrally in the following process (the process of the hazard-degree updating section 102).

In this case, in contrast to the operation of increasing the degree of hazard, the decreasing operation is not applied to the adjacent areas of the target place. This is because determination of decreasing the degree of hazard is made individually and processed for each target place.

The hazard-degree updating section 102 receives hazard-degree update information of each target from the hazard-degree-update-information generating section 101, and stores the present hazard degree of each target in the hazard degree DB 103. Targets that have already been stored in the hazard degree DB 103 are updated according to the hazard-degree update information received from the hazard-degree-update-information generating section 101. For targets that have not stored in the hazard degree DB 103, hazard-degree update information received from the hazard-degree-update-information generating section 101 is stored as the present hazard degree of the targets. Thus, the hazard-degree-update-information generating section 101 and the hazard-degree updating section 102 in cooperation function as hazard-degree increasing means. When the degree of hazard is increased, the update date is recorded as the last rating date.

The hazard degree DB 103 is divided by the target into an avatar hazard DB, an object hazard DB, and a place hazard DB.

Referring to FIG. 10, the avatar hazard DB stores the IDs of avatars subjected to hazard rating and their present degrees of hazard, and the last rating dates in tabular form.

FIG. 11 is a diagram of the object hazard DB. The object hazard DB stores the IDs of objects subjected to hazard rating and their present degrees of hazard, and the last rating dates in tabular form.

FIG. 12 is a diagram of the place hazard DB. The place hazard DB stores position information (the X-coordinate and the Y-coordinate) of places whose hazard degrees are rated, their present degrees of hazard, and the last rating dates in tabular form.

Thus, the hazard DB 103 stores the degrees of hazard of targets and target identifying information, and hazard rating times in association with one another, which corresponds to hazard storing means.

FIG. 13 shows an example in which the degrees of hazard of places are updated on a hazard map. FIG. 13(*a*) shows the degrees of hazard of the same places as in FIG. 7. They are stored in the place hazard DB as shown in FIG. 12. Suppose that a new hazard distribution of places as shown in FIG. 13(*b*) is input. This is the hazard distribution of the area around the place (4, 7) that is rated as a hazard degree 5. Here, the degree of hazard of the place (4, 7) is calculated by a monotone two-degree decreasing method (Method 2 described above).

According to FIG. 13(*b*), hazard-degree update information of 25 places in total is generated by the hazard-degree-update-information generating section 101.

The hazard-degree updating section 102 updates the place hazard DB according to the 25 pieces of update information. The results are shown in FIG. 13(*c*). Since the nine hatched cells have already been stored in the place hazard DB (FIG. 12), the sums of the degrees of hazard and the values of update information are stored as new degrees.

The degrees of the other 16 places are not stored in the place hazard DB, so that the update information is stored as their degrees of hazard.

Referring back to FIG. 2, the hazard-degree-decrease monitoring section 104 monitors the hazard degree DB 103 to check to see if a predetermined period has passed from the last rating dates of the targets stored in the hazard degree DB 103 such as the avatar hazard DB. The monitoring is executed at a predetermined cycle, generally, once a day.

Since a target in which the predetermined period has passed is not subjected to new hazard rating for at least the predetermined period, information that identifies the target (for example, the avatar ID or position information) is extracted, and sent to the hazard-degree-decrease instructing section 105.

The hazard-degree-decrease instructing section 105 receives the information that identifies the target of decrease in hazard degree from the hazard-degree-decrease monitoring section 104, determines the decrement, and sends a combination of the information that identifies the target and the decrement to the hazard-degree-update-information generating section 101. The decrement may be varied from target to target or may be set to a fixed value. To determine the decrement according to the target, a table in which the information that identifies targets and their decrements are associated with each other should be provided. Its description will be omitted here. Thus, the hazard-degree-decrease monitoring section 104, the hazard-degree-decrease instructing section 105, the hazard-degree-update-information generating section 101, and the hazard-degree updating section 102 function in cooperation as hazard increasing means.

The hazard-degree-display instructing section 106 issues an instruction to display the degrees of hazard of the targets stored in the hazard degree DB 103 on the screen of the user terminal 10. Displays in a virtual space include a display when a target appears in a scene and a display on a map. Accordingly, the hazard-degree-display instructing section 106 corresponds to hazard-information-output instructing means.

Figure 14:
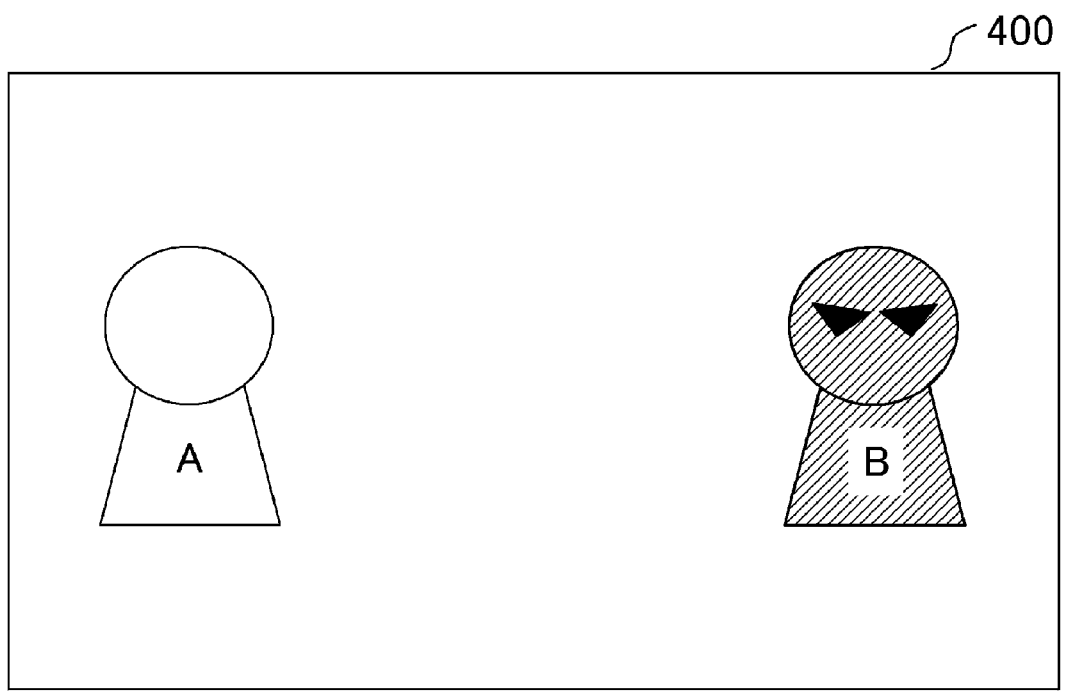
FIG. 14 is a diagram of an example in which an avatar rated for hazard degree is displayed in a virtual space, according to the first embodiment.
Figure 15:
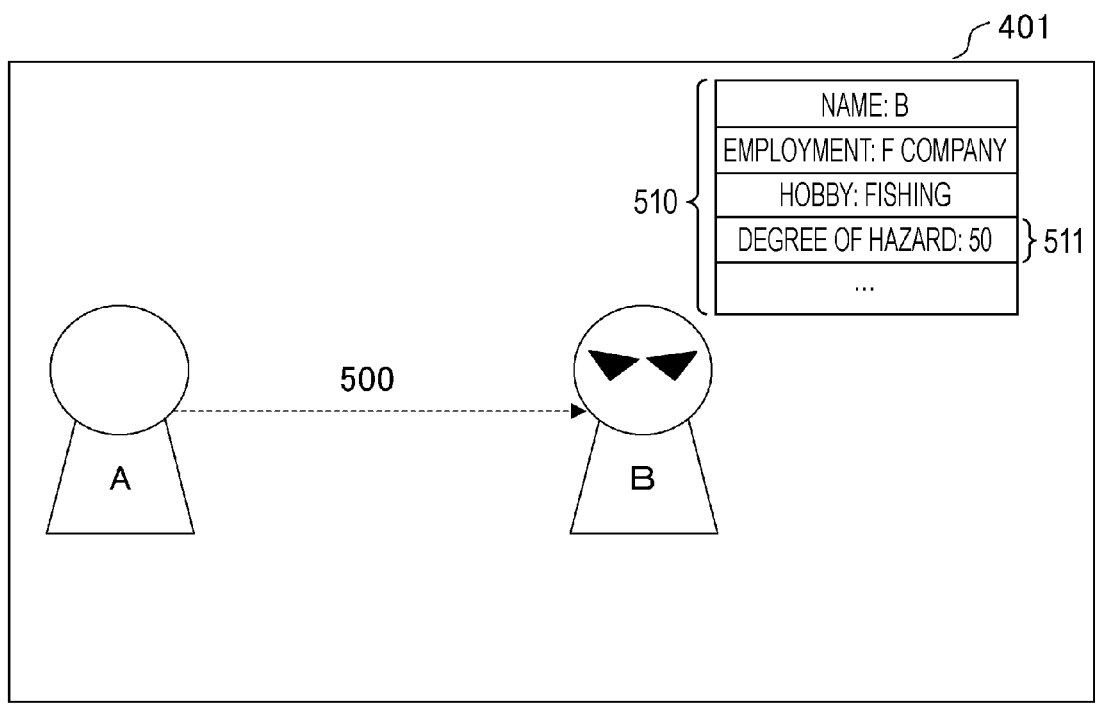
FIG. 15 is a diagram of an example in which an avatar rated for hazard degree is displayed in a virtual space, according to the first embodiment.

Referring to FIGS. 14 and 15, an avatar rated for hazard degree is displayed in a virtual space.

FIG. 14 shows an example in which when an avatar B rated for hazard degree appears in a virtual space 400, the avatar B is changed visually, for example, in color (the hatched portion in the drawing). This allows the user to recognize that an avatar that the user encounters is a hazardous avatar. In this way, the hazard-information-output instructing means issues an instruction to output information indicative of whether or not the target displayed on the user terminal is hazardous.

FIG. 15 shows an example in which the user refers for the attribute of a target avatar, the degree of hazard thereof is displayed. When the user left-clicks on the target avatar, a broken-line arrow 500 extending from the avatar A to the avatar B is displayed. Then, when the user right-clicks on the target avatar, a list 510 of the attributes of the avatar is displayed. The degree of hazard 511 is displayed in the list 510.

FIG. 16 shows maps on which targets rated for hazard degree are displayed. FIG. 16(*a*) shows the rated places in a different color or the like (in FIG. 16(*a*), in a hatch pattern). Coloring with gradations according to the degree of hazard is more effective because it makes the targets look solid. The place where the user's avatar is at present is displayed at the same time. This allows the user to know the relationship with the hazardous places. FIG. 16(*b*) displays an avatar rated for the degree of hazard and an object rated for the degree of hazard on a map. In this way, the hazard-information-output instructing means makes the position information of a hazardous avatar or object be displayed on the user terminal.

Referring back to FIG. 2, the place where an avatar or the like is at present is not known only with the information stored in the hazard degree DB 103. Therefore, the place is found using the avatar ID with reference to the management DB 120.

In response to a detection instruction from the user, the hazard detecting section 107 extracts a hazardous target, and sends it to the hazard-degree-display instructing section 106. There are various detection methods, for example, a method of detection by designating one of an avatar, object, and place, a method of designating a reference value and detecting a target having a hazard degree higher than the reference value, a method of designating an area and detecting a hazardous target within the area, and a method of a combination thereof. In detection, the management DB 120 and the hazard degree DB 103 are referred to as necessary.

The hazard-deletion monitoring section 108 monitors an avatar and an object that have disappeared from the virtual space. The monitoring is performed in a predetermined cycle to extract the ID of an avatar or the like that has disappeared on the avatar management DB after the previous monitoring. The hazard-deletion monitoring section 108 sends the result of extraction to the hazard deleting section 109.

The hazard deleting section 109 receives the avatar ID or the like from the hazard-deletion monitoring section 108 and, when the record of the avatar ID or the like remains in the hazard degree DB 103, deletes the record. This is because there is no need to manage the degree of hazard of a disappeared avatar or the like. As a result, hazard management is performed only for the targets remaining in the hazard degree DB 103. This makes the process efficient and saves the storage space of the hazard degree DB 103. Thus, the hazard-deletion monitoring section 108 and the hazard deleting section 109 work together as hazard deleting means.

The virtual-space hazard assessment system 30 functions as described above.

Figure 17:
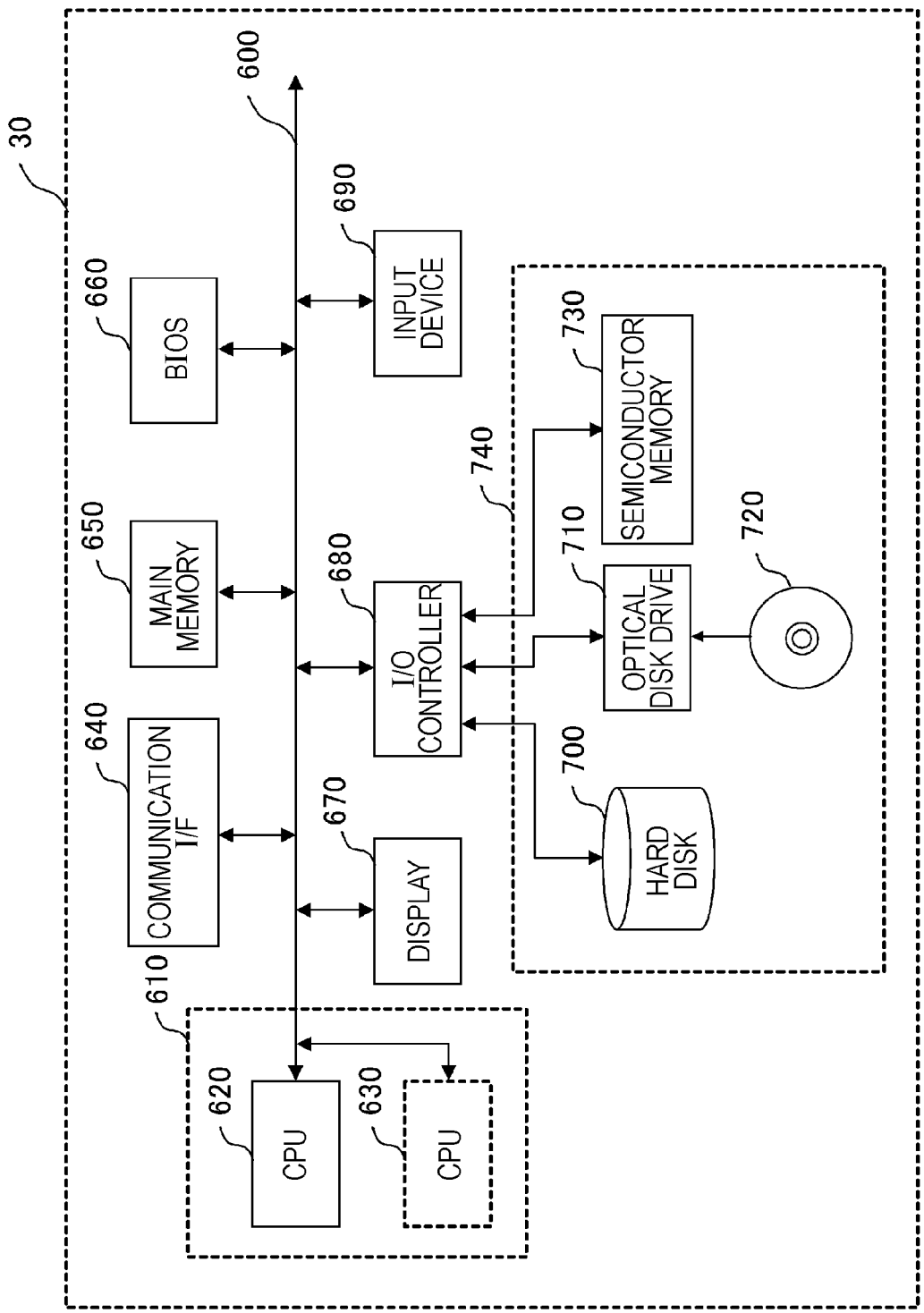
FIG. 17 is a diagram of the hardware configuration of the virtual-space hazard assessment system 30 according to the first embodiment.

Referring to FIG. 17, a diagram of the hardware configuration of the virtual-space hazard assessment system 30 according to this embodiment is shown. An example of the configuration will be shown below.

The virtual-space hazard assessment system 30 includes a central processing unit (CPU) 620 (a multiprocessor configuration may include multiple additional CPUs 630) that constitutes a control unit 610, a bus line 600, a communication interface (I/F) 640, a main memory 650, a basic input output system (BIOS) 660, a display 670, an I/O controller 680, an input device 690 such as a keyboard and mouse, a hard disk 700, an optical disk drive 710, and a semiconductor memory 730. The hard disk 700, the optical disk drive 710, and the semiconductor memory 730 are collectively referred to as a storage unit 740.

The control unit 610 centrally controls the virtual-space hazard assessment system 30, and achieves the various functions of the invention in cooperation with the above-described hardware by reading and executing the programs stored in the hard disk 700 (to be described later).

The communication I/F 640 is a network adapter used when the virtual-space hazard assessment system 30 transmits and receives information to/from the user terminals 10 (FIG. 1) via the Internet 40 (FIG. 1). The communication I/F 640 may include a modem, a cable modem, and an Ethernet (a registered trademark) adapter.

The BIOS 660 stores a boot program that the CPU 620 executes to start the virtual-space hazard assessment system 30, a program depending on the hardware of the virtual-space hazard assessment system 30 and so on.

The display 670 includes a cathode-ray tube (CRT) display and a liquid-crystal display (LCD).

The I/O controller 680 can be connected to the storage unit 740 such as the hard disk 700, the optical disk drive 710, and the semiconductor memory 730.

The input device 690 receives the input of the manager of the virtual-space hazard assessment system 30.

The hard disk 700 stores various programs for the hardware to work as the virtual-space hazard assessment system 30, programs for achieving the functions of the invention, and the above-described databases. The virtual-space hazard assessment system 30 can use an external hard disk (not shown) as an external storage unit.

Examples of the optical disk drive 710 include a DVD-ROM drive, a CD-ROM drive, a DVD-RAM drive, and a CD-RAM drive. In this case, optical disks 720 corresponding to the drives are used. It is also possible that a program or data is read from the optical disk 720 by the optical disk drive 710 and provided to the main memory 650 or the hard disk 700 via the I/O controller 680.

The computer in the invention refers to an information processing unit equipped with a storage unit and a control unit. The virtual-space hazard assessment system 30 is configured as an information processing unit equipped with the storage unit 740 and the control unit 610. The information processing unit is included in the concept of the computer of the invention.

The control unit 610 mainly corresponds to the hazard-rating-request receiving section 100, the hazard-degree-update-information generating section 101, the hazard-degree updating section 102, the hazard-degree-decrease monitoring section 104, the hazard-degree-decrease instructing section 105, the hazard-degree-display instructing section 106, the hazard detecting section 107, the hazard-deletion monitoring section 108, and the hazard deleting section 109. The storage unit 740 mainly corresponds to the hazard degree DB 103.

While the hardware configuration of the virtual-space hazard assessment system 30 has been described, the user terminal 10 of the invention can also be achieved by a similar hardware configuration.

Figure 18:
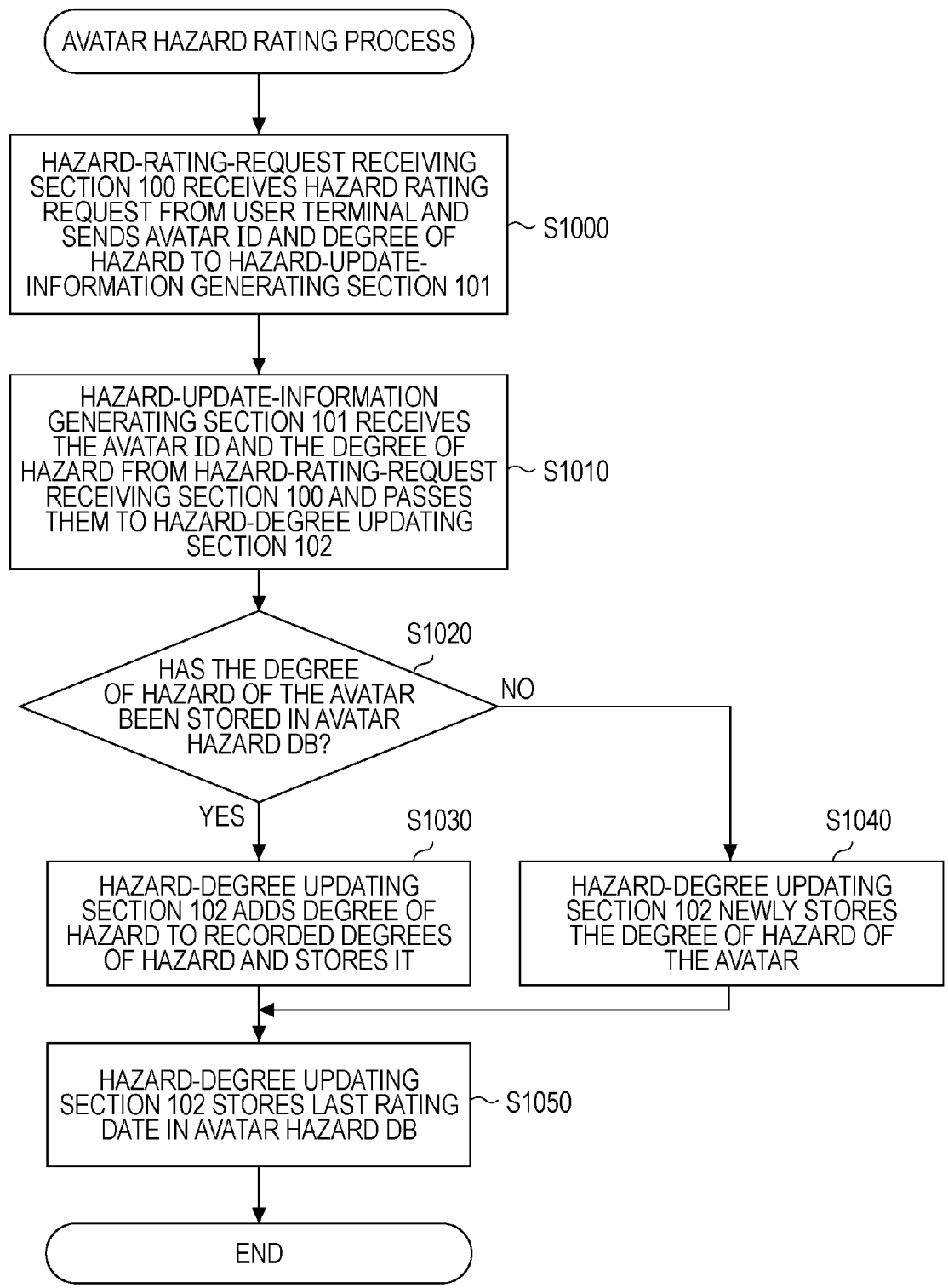
FIG. 18 is a flowchart for rating the degree of hazard of avatars, according to the first embodiment.

FIG. 18 is a flowchart for rating the degree of hazard of avatars.

S1000: The hazard-rating-request receiving section 100 receives a hazard rating request from the user terminal 10, and sends the ID of the avatar and the degree of hazard to be added to the hazard-degree-update-information generating section 101.

S1010: The hazard-degree-update-information generating section 101 receives the avatar ID and the degree of hazard from the hazard-rating-request receiving section 100, and sends them to the hazard-degree updating section 102.

S1020: The hazard-degree updating section 102 determines whether the hazard degree of the avatar has already been stored in the avatar hazard DB. If it has been stored (YES), then the process moves to S1030. If it has not been stored (NO), then the process moves to S1040.

S1030: The hazard-degree updating section 102 adds the degree to be added to the stored degree, and stores it.

S1040: The hazard-degree updating section 102 newly stores the hazard degree of the avatar.

S1050: The hazard-degree updating section 102 stores the last rating date in the avatar hazard DB.

This also applies to the rating of objects.

Figure 19:
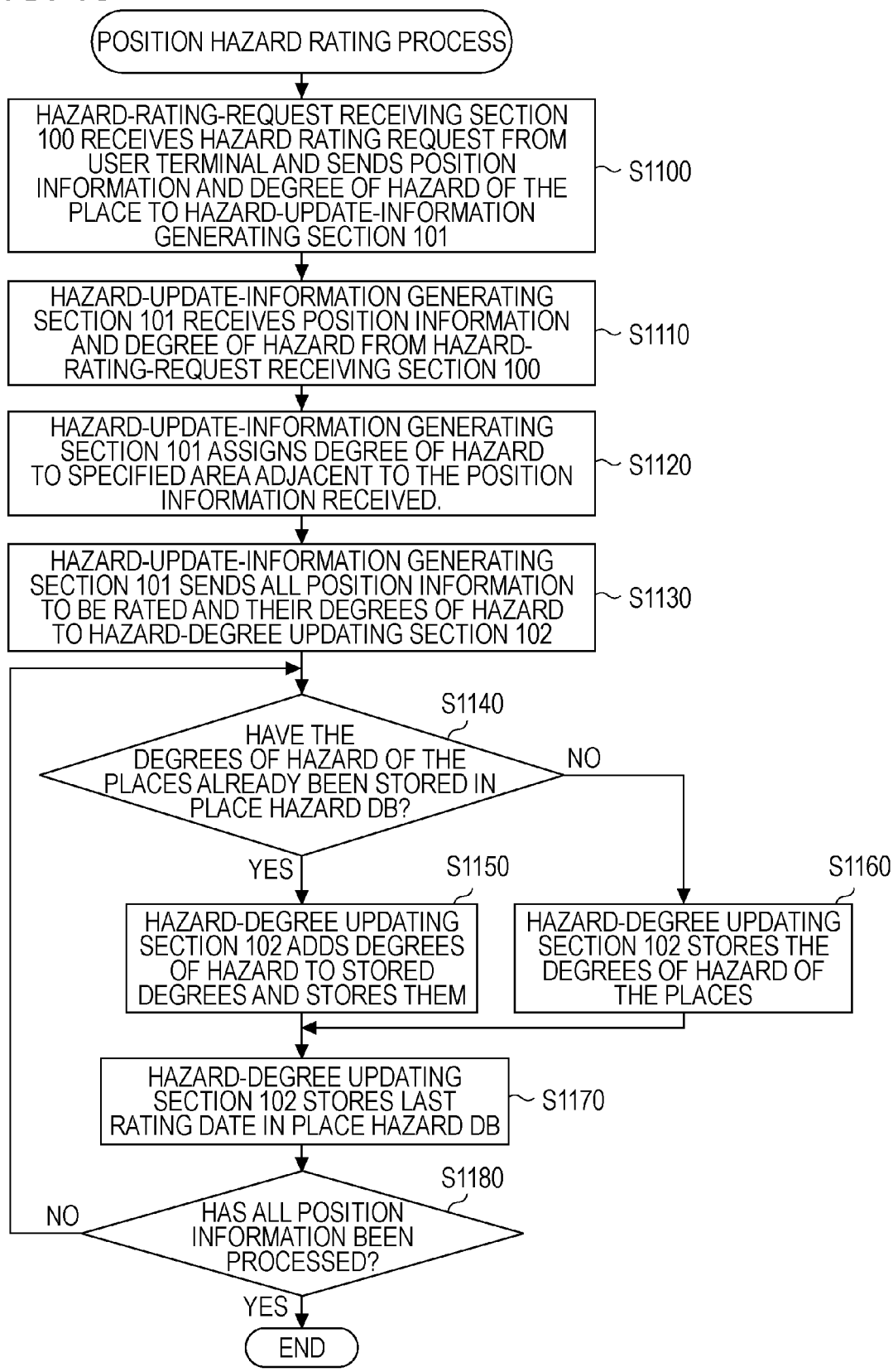
FIG. 19 is a flowchart for rating the degree of hazard of places, according to the first embodiment.

FIG. 19 is a flowchart for rating the degree of hazard of places.

S1100: The hazard-rating-request receiving section 100 receives a hazard rating request from the user terminal 10 and sends position information of the place and the degree of hazard to be rated to the hazard-degree-update-information generating section 101.

S1110: The hazard-degree-update-information generating section 101 receives the position information of the place and the degree of hazard from the hazard-rating-request receiving section 100.

S1120: The hazard-degree-update-information generating section 101 assigns hazard degrees to places adjacent to the place of the position information received.

S1130: The hazard-degree-update-information generating section 101 sends all the position information to be rated and the hazard degrees to the hazard-degree updating section 102.

S1140: The hazard-degree updating section 102 determines whether the hazard degrees of the places have already been stored in the place hazard DB. If they have been stored (YES), then the process moves to S1150. If they have not been stored (NO), then the process moves to S1160.

S1150: The hazard-degree updating section 102 adds the degrees to be added to the stored degrees, and stores them.

S1160: The hazard-degree updating section 102 stores the hazard degrees of the places.

S1170: The hazard-degree updating section 102 stores the last rating date in the place hazard DB.

S1180: The hazard-degree updating section 102 determines whether the process of all the position information has been completed. If it has been completed (YES), then the process is terminated. If it has not been completed (NO), the process moves to S1140, and the process from steps S1140 to S1170 is repeated.

Figure 20:
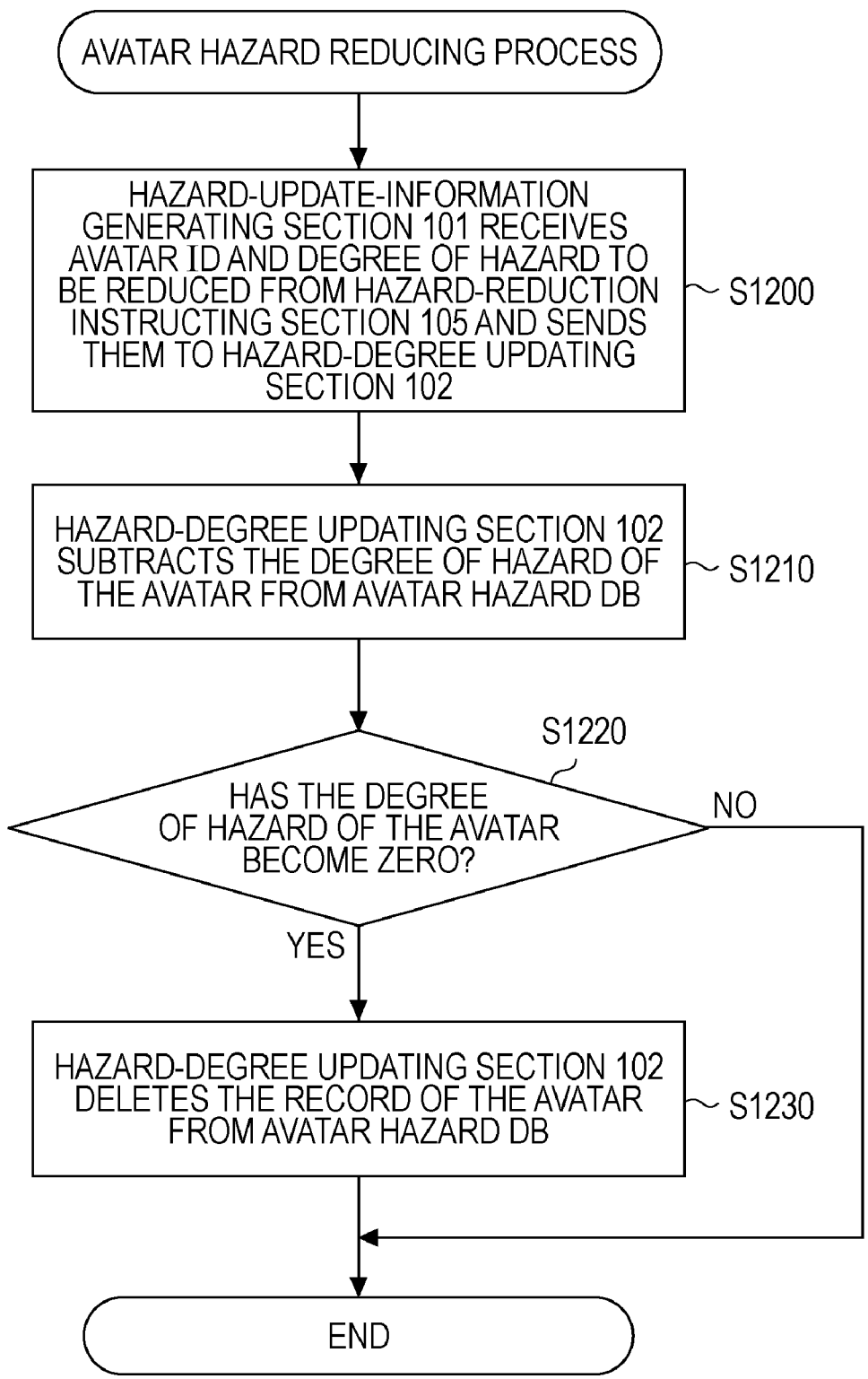
FIG. 20 is a flowchart for decreasing the degree of hazard of an avatar, according to the first embodiment.

FIG. 20 is a flowchart for decreasing the degree of hazard of an avatar.

S1200: The hazard-degree-update-information generating section 101 receives an avatar ID and the degree of hazard to be decreased from the hazard-degree-decrease instructing section 105, and sends them to the hazard-degree updating section 102.

S1210: The hazard-degree updating section 102 subtracts the degree of hazard of the avatar from that in the avatar hazard DB.

S1220: The hazard-degree updating section 102 determines whether the degree of hazard of the avatar has become zero. If it has become zero (YES), the process moves to S1230. If it has not become zero (NO), the process is terminated.

S1230: The hazard-degree updating section 102 deletes the record of the avatar from the avatar hazard DB.

This also applies to decreasing the degrees of objects.

Figure 21:
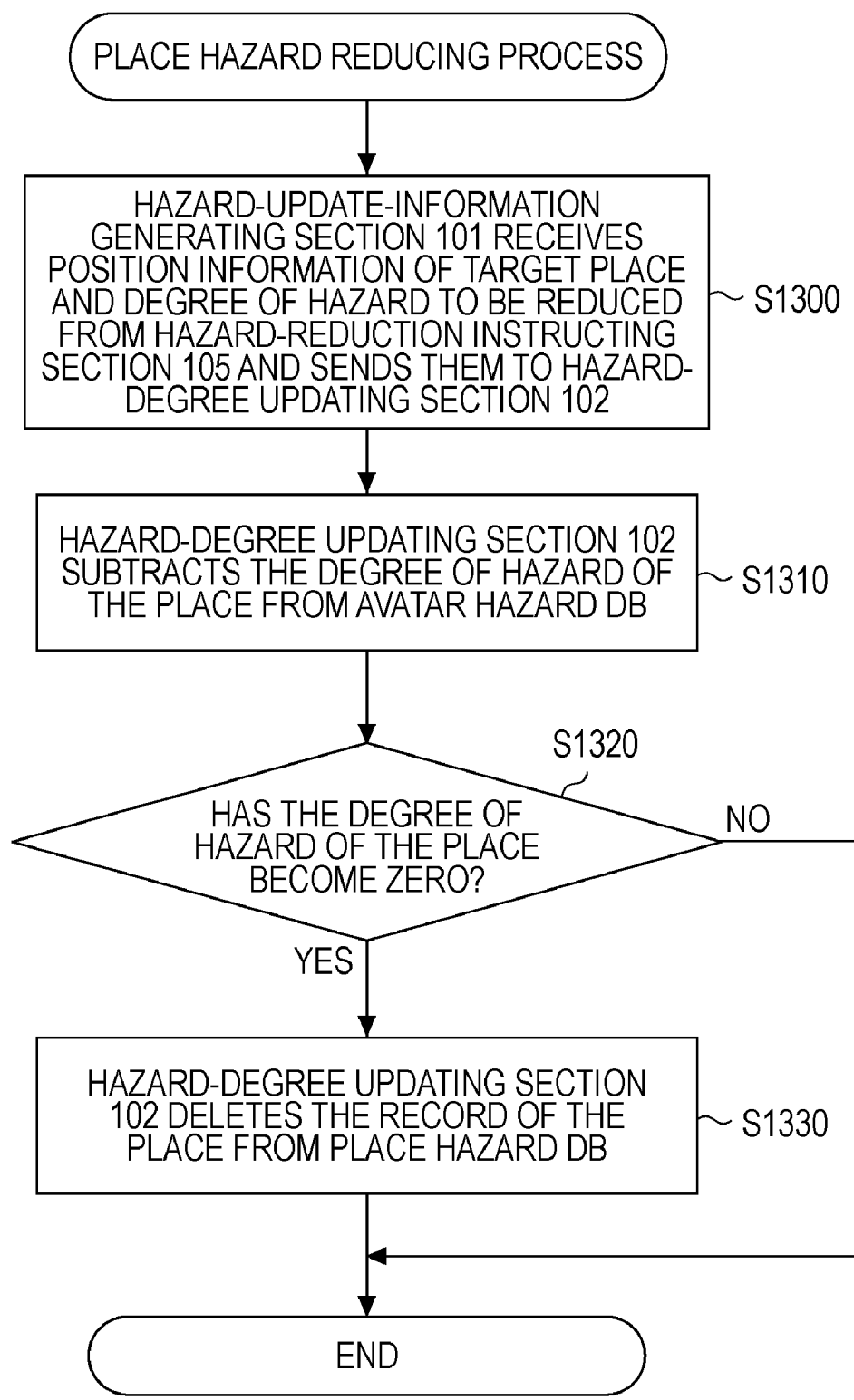
FIG. 21 is a flowchart for decreasing the degrees of hazard of places, according to the first embodiment.

FIG. 21 is a flowchart for decreasing the degrees of hazard of places.

S1300: The hazard-degree-update-information generating section 101 receives the position information of a target place to be decreased in hazard degree and the degree of hazard to be decreased from the hazard-degree-decrease instructing section 105, and sends them to the hazard-degree updating section 102.

S1310: The hazard-degree updating section 102 subtracts the degree of hazard of the place from that in the place hazard DB.

S1320: The hazard-degree updating section 102 determines whether the degree of hazard of the place has become zero. If it has become zero (YES), the process moves to S1330. If it has not become zero (NO), the process is terminated.

S1330: The hazard-degree updating section 102 deletes the record of the place from the place hazard DB.

A second embodiment of the invention performs the hazard-degree decreasing process not according to the time elapsed from the last hazard rating but according to only a lapse of time. In other words, this is a model in which a decline in the degree of hazard of a target (a decrease in the degree of hazard) proceeds with time irrespective of whether hazard rating is performed. However, the degree of hazard of the target is substantially maintained as long as a new degree is added by slowing down the decline appropriately.

In this embodiment, the user can select whether to display the degree of hazard on the user terminal 10.

In this embodiment, the degree of hazard is indicated not only visually but also by voice.

Figure 22:
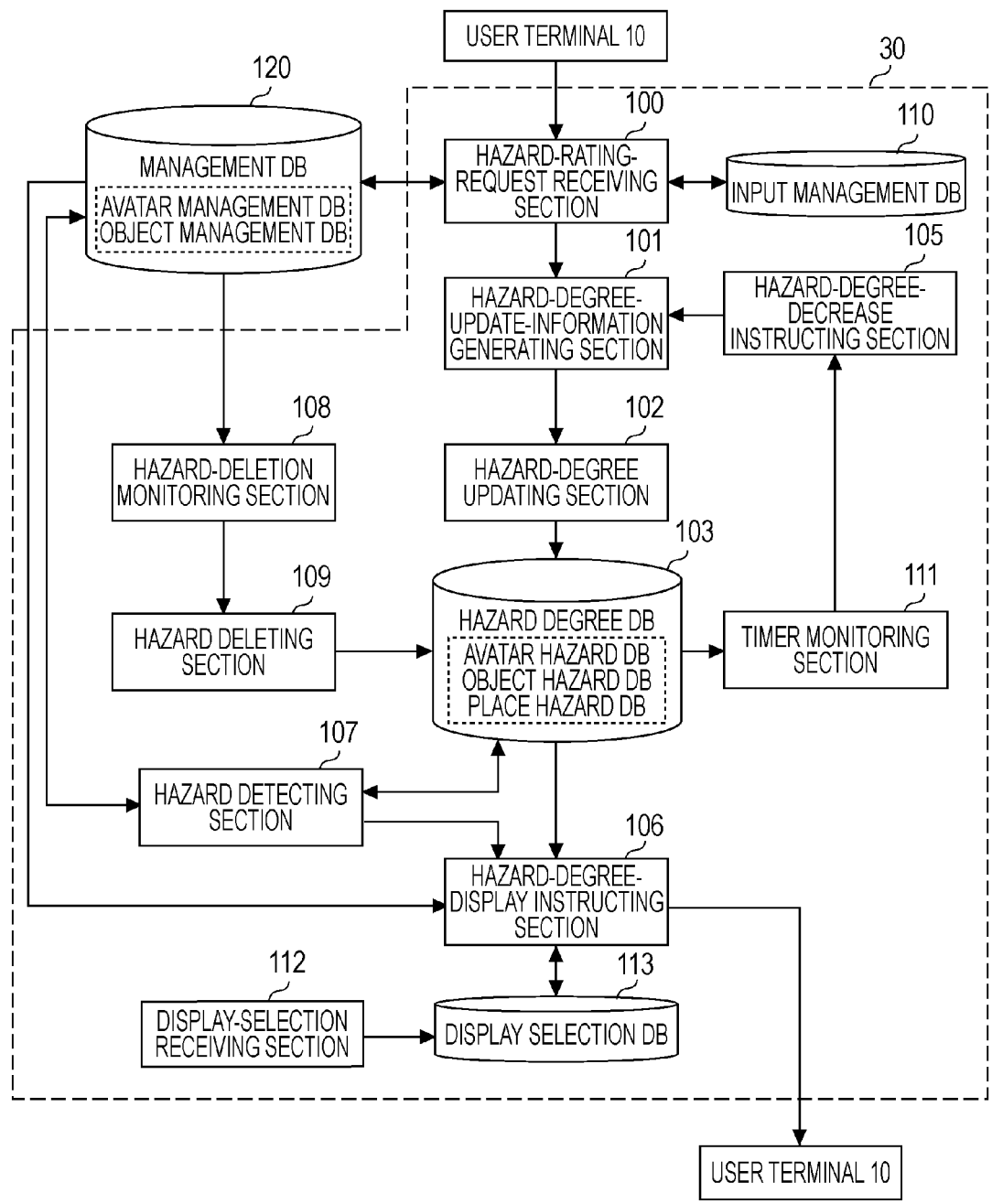
FIG. 22 is a block diagram of the functional structure of a virtual-space hazard assessment system according to a second embodiment of the invention.

FIG. 22 is a block diagram of the functional structure of a virtual-space hazard assessment system according to this embodiment.

This structure is different from that of FIG. 2 in that it has a timer monitoring section 111 instead of the hazard-degree-decrease monitoring section 104 and has a display-selection receiving section 112 and a display selection DB 113 to allow selection of display of hazard degrees on the user terminal 10.

The timer monitoring section 111 extracts information (for example, avatar IDs and position information) that identifies all the targets stored in the hazard degree DB 103 in cycles, for example, on a daily basis, and sends them to the hazard-degree-decrease instructing section 105.

As in the first embodiment, the hazard-degree-decrease instructing section 105 determines the amount of decrease in hazard degree of the information that identifies the target, received from the timer monitoring section 111, and sends a combination of the target identifying information and the amount of decrease to the hazard-degree-update-information generating section 101. In this case, it is preferable to set the amount of decrease smaller than that of the first embodiment.

This is because the first embodiment decreases the degree of hazard of a target that has not been subjected to hazard rating for a predetermined time, while this embodiment decreases the degree of hazard everyday irrespective of whether hazard rating is performed. For example, assuming that the predetermined period in the first embodiment is ten days, it is preferable that the amount of decrease in this embodiment be about one tenth of that of the first embodiment.

The display-selection receiving section 112 receives selection whether to display the degree of hazard on the user terminal 10 from the user. The user can select between display and non-display.

The result received is stored in the display selection DB 113. When issuing an instruction to display the degree of hazard to the user terminal 10, the hazard-degree-display instructing section 106 determines whether to display the degree of hazard with reference the display selection DB 113. Thus, the hazard-information-output instructing means issues an instruction to output information of the degree of hazard of the target according to the selection of whether or not to output the hazard information.

FIG. 23 is a diagram of the display selection DB 113. The display selection DB 113 stores user IDs and selection of display. When the selection of display is "1", the degree of hazard is displayed, while it is "0", the degree of hazard is not displayed.

In this embodiment, when a user's avatar approaches a hazardous target and the distance therebetween falls to a predetermined reference value or less, the hazard-degree-display instructing section 106 sends an instruction to output a warning beep according to the distance to the user terminal 10.

When the target is an avatar or an object, the position information is grasped with reference to the avatar management DB or the object management DB so that the distance from the user's avatar can be determined.

When the target is a place, the position information is grasped directly from the place management DB so that the distance from the user's avatar can be determined. The position information of the user's avatar is acquired from the avatar management DB. When the target is a place, the area subjected to hazard rating extends over a predetermined area. Therefore, a warning beep may be output only when the user's avatar enters the area. The warning may not be sound but may be alarm display.

Thus, the hazard-information-output instructing means issues an instruction to output information (warning beep) determined according to user position information and position information of a hazardous target.

FIG. 24 is a flowchart for a warning-beep outputting process.

S1400: The hazard-degree-display instructing section 106 acquires the position information of the user's avatar with reference to the avatar management DB.

S1410: The hazard-degree-display instructing section 106 acquires the position information of a hazardous target.

S1420: The hazard-degree-display instructing section 106 calculates the distance between the user's avatar and the hazardous target.

S1430: The hazard-degree-display instructing section 106 determined whether the distance is a reference value or less. If the distance is the reference value or less (YES), the process moves to step S1440. If it is not the reference value or less (NO), the process is terminated.

S1440: The hazard-degree-display instructing section 106 sets the volume according to the distance, and sends a warning beep to the user terminal 10.

This embodiment is different from the first embodiment when hazard rating performed intermittently because the hazard-degree decreasing process proceeds irrespective of hazard rating. In the first embodiment, the degree of hazard is not decreased as long as hazard rating is performed within a predetermined period for determining whether to decrease the degree of hazard. However, in the second embodiment, the degree of hazard is not increased unless the degree of hazard is increased at a speed higher than the decreasing speed.

An appropriate method may be adopted in accordance with the nature of the hazard.

In this embodiment, the user can be informed of a hazardous target by a warning beep or the like when the user approaches a predetermined distance without the need for constant careful attention to a hazardous target. This allows the user to select the display of hazard degree at that time, and act carefully.

While the invention has been described in its preferred embodiments, it is to be understood that the invention is not limited to the above-described embodiments. It is also to be understood that the advantages of the embodiments of the invention are the most preferred advantages of the invention and that the advantages of the invention are not limited to those of the embodiments.

We claim:

1. A virtual-space hazard assessment system, for use in a virtual space having target identifying information that identifies a target that appears in the virtual space, comprising:
    a hazard-rating-request receiver for receiving a hazard rating request to rate the degree of hazard of the target, the degree being a value inputted to a terminal by the user;
    hazard storage for storing a table in which the degree of hazard of the target and the target identifying information are associated with each other;
    hazard-degree increasing means for increasing the degree of hazard of the target stored in the table in the hazard storage according to the degree of hazard received by the hazard-rating-request receiver;
    hazard-degree decreasing means for decreasing the degree of hazard stored in the table in the hazard storage with the elapse of time; and
    hazard-information-output instructing means for issuing an instruction to output the stored hazard information,
    wherein the target includes a place; and
    the assessment system further includes a proximity-hazard-degree calculator for calculating the degree of hazard of an area adjacent to the place according to the degree of hazard of the place.

2. The virtual-space hazard assessment system according to claim 1, wherein:
    the hazard storage further stores the time when the target is subjected to hazard rating and the target identifying information of the target in association with each other; and
    the hazard-degree decreasing means decreases the degree of hazard of the target according to the time elapsed after the target is subjected to hazard rating.

3. The virtual-space hazard assessment system according to claim 1, further comprising:
    input storage for storing information that identifies a user who rates the degree of hazard of the target, the time when the target is subjected to hazard rating, and the target identifying information of the target in association with one another; and
    abnormal-hazard-rating preventing means for preventing repeated rating of the degree of hazard of the same target by the same user in a predetermined time according to the record in the input storage means.

4. The virtual-space hazard assessment system according to claim 1, wherein the hazard-rating-request receiver receives the degree of hazard designated by the user.

5. The virtual-space hazard assessment system according to claim 1, wherein the hazard-information-output instructing means causes the position information of a hazardous target to be displayed on the user terminal.

6. The virtual-space hazard assessment system according to claim 1, wherein the hazard-information-output instructing means issues an instruction to output information indicative of whether a target displayed on the user terminal is hazardous.

7. The virtual-space hazard assessment system according to claim 1, wherein the hazard-information-output instructing means issues an instruction to output information determined from the position information of the user and the position information of a hazardous target.

8. The virtual-space hazard assessment system according to claim 1, wherein the hazard-information-output instructing means issues an instruction to output the information of the degree of hazard of the target according to the selection of whether or not to output the information of the degree of hazard of the target.

9. The virtual-space hazard assessment system according to claim 1, further comprising hazard deleting means for deleting the information of the degree of hazard of a target that has disappeared from the virtual space from the table stored in the hazard storage.

10. A method of determining degree of hazard of a virtual space having target identifying information that identifies a target that appears in the virtual space, the method comprising:
    providing a computer and using the computer to perform each of the following steps;
    receiving a hazard rating request to rate the degree of hazard of the target, the degree being a value inputted to a terminal by the user;
    storing a table in a storage unit, the table listing the degree of hazard of the target and the target identifying information in association with each other;
    increasing the degree of hazard of the target stored in the table in the storage unit in response to the hazard rating request;
    decreasing the degree of hazard of the target stored in the table in the storage unit in response to the elapse of time; and
    outputting the degree of hazard stored in the table,
    wherein the target includes a place; and
    the computer calculates the degree of hazard of an area adjacent to the place according to the degree of hazard of the place.

11. The method for assessing the degree of hazard of a virtual space according to claim 10, wherein:
    the computer stores the time when the target is subjected to hazard rating and the target identifying information of the target in association with each other; and
    the computer decreases the degree of hazard of the target according to the time elapsed after the target is subjected to hazard rating.

12. The method for assessing the degree of hazard of a virtual space according to claim 10, wherein the computer displays the position information of a hazardous target on the user terminal.

13. The method for assessing the degree of hazard of a virtual space according to claim 10, wherein the computer outputs information indicative of whether a target displayed on the user terminal is hazardous.

14. The method for assessing the degree of hazard of a virtual space according to claim 10, wherein the computer outputs information determined from the position information of the user and the position information of a hazardous target.

15. An article of manufacture tangibly embodying computer readable program code, which when executed by a computer, will cause the computer to perform the following method steps:
   receiving a hazard rating request to rate the degree of hazard of the target, the degree being a value inputted to a terminal by the user;
   storing a table in a storage unit, the table listing the degree of hazard of the target and the target identifying information in association with each other;
   increasing the degree of hazard of the target stored in the table in the storage unit in response to the hazard rating request;
   decreasing the degree of hazard of the target stored in the table in the storage unit in response to the elapse of time; and
   outputting the degree of hazard stored in the table,
   wherein the target includes a place; and
   the computer calculates the degree of hazard of an area adjacent to the place according to the degree of hazard of the place.

16. A virtual-space hazard assessment system, for use in a virtual space having target identifying information that identifies a target that appears in the virtual space, comprising:
   a hazard-rating-request receiver for receiving a hazard rating request to rate the degree of hazard of the target, the degree being a value inputted to a terminal by the user;
   hazard storage for storing a table in which the degree of hazard of the target and the target identifying information are associated with each other;
   hazard-degree increasing means for increasing the degree of hazard of the target stored in the table in the hazard storage according to the degree of hazard received by the hazard-rating-request receiver;
   hazard-degree decreasing means for decreasing the degree of hazard stored in the table in the hazard storage with the elapse of time; and
   hazard-information-output instructing means for issuing an instruction to output the stored hazard information,
   wherein the target includes a place; and
   the assessment system further includes a proximity-hazard-degree calculator for calculating the degree of hazard of an area adjacent to the place according to the degree of hazard of the place,
   wherein the degree of hazard is determined in advance according to the place; and
   the proximity-hazard-degree calculator calculates the degree of hazard of the area adjacent to the place using the calculation method according to the place.

17. The virtual-space hazard assessment system according to claim 16, wherein:
   the hazard storage further stores the time when the target is subjected to hazard rating and the target identifying information of the target in association with each other; and
   the hazard-degree decreasing means decreases the degree of hazard of the target according to the time elapsed after the target is subjected to hazard rating.

18. The virtual-space hazard assessment system according to claim 16, further comprising:
   input storage for storing information that identifies a user who rates the degree of hazard of the target, the time when the target is subjected to hazard rating, and the target identifying information of the target in association with one another; and
   abnormal-hazard-rating preventing means for preventing repeated rating of the degree of hazard of the same target by the same user in a predetermined time according to the record in the input storage means.

19. The virtual-space hazard assessment system according to claim 16, wherein the hazard-rating-request receiver receives the degree of hazard designated by the user.

20. The virtual-space hazard assessment system according to claim 16, wherein the hazard-information-output instructing means causes the position information of a hazardous target to be displayed on the user terminal.

21. The virtual-space hazard assessment system according to claim 16, wherein the hazard-information-output instructing means issues an instruction to output information indicative of whether a target displayed on the user terminal is hazardous.

22. The virtual-space hazard assessment system according to claim 16, wherein the hazard-information-output instructing means issues an instruction to output information determined from the position information of the user and the position information of a hazardous target.

23. The virtual-space hazard assessment system according to claim 16, wherein the hazard-information-output instructing means issues an instruction to output the information of the degree of hazard of the target according to the selection of whether or not to output the information of the degree of hazard of the target.

24. The virtual-space hazard assessment system according to claim 16, further comprising hazard deleting means for deleting the information of the degree of hazard of a target that has disappeared from the virtual space from the table stored in the hazard storage.

25. A method of determining degree of hazard of a virtual space having target identifying information that identifies a target that appears in the virtual space, the method comprising:
   providing a computer and using the computer to perform each of the following steps;
   receiving a hazard rating request to rate the degree of hazard of the target, the degree being a value inputted to a terminal by the user;
   storing a table in a storage unit, the table listing the degree of hazard of the target and the target identifying information in association with each other;
   increasing the degree of hazard of the target stored in the table in the storage unit in response to the hazard rating request;
   decreasing the degree of hazard of the target stored in the table in the storage unit in response to the elapse of time; and
   outputting the degree of hazard stored in the table,
   wherein the target includes a place; and
   the computer calculates the degree of hazard of an area adjacent to the place according to the degree of hazard of the place,
   wherein a method for calculating the degree of hazard is determined in advance for each place; and
   the computer calculates the degree of hazard of the area adjacent to the place using the calculation method according to the place.

26. The method for assessing the degree of hazard of a virtual space according to claim 25, wherein:

the computer stores the time when the target is subjected to hazard rating and the target identifying information of the target in association with each other;

and the computer decreases the degree of hazard of the target according to the time elapsed after the target is subjected to hazard rating.

27. The method for assessing the degree of hazard of a virtual space according to claim 25, wherein the computer displays the position information of a hazardous target on the user terminal.

28. The method for assessing the degree of hazard of a virtual space according to claim 25, wherein the computer outputs information indicative of whether a target displayed on the user terminal is hazardous.

29. The method for assessing the degree of hazard of a virtual space according to claim 25, wherein the computer outputs information determined from the position information of the user and the position information of a hazardous target.

* * * * *